(12) United States Patent
Doshi et al.

(10) Patent No.: US 12,418,701 B2
(45) Date of Patent: Sep. 16, 2025

(54) CONTENT NAVIGATION AND PERSONALIZATION

(71) Applicant: DISNEY ENTERPRISES, INC., Burbank, CA (US)

(72) Inventors: Sonia Doshi, Los Angeles, CA (US); Lauren R. Boros, Manhattan Beach, CA (US); Elinor A. Chin, Burbank, CA (US); Evan R. Golden, Los Angeles, CA (US); Ricardo A. Melgoza, Burbank, CA (US); April Hui Wang, El Segundo, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 199 days.

(21) Appl. No.: 17/687,253

(22) Filed: Mar. 4, 2022

(65) Prior Publication Data
US 2023/0283849 A1 Sep. 7, 2023

(51) Int. Cl.
*H04N 21/472* (2011.01)
*H04N 21/235* (2011.01)

(52) U.S. Cl.
CPC ....... *H04N 21/472* (2013.01); *H04N 21/2353* (2013.01)

(58) Field of Classification Search
CPC .......................... H04N 21/472; H04N 21/2353
See application file for complete search history.

(56) References Cited

U.S. PATENT DOCUMENTS

| 9,055,343 | B1 | 6/2015 | Lewis et al. |
| 9,319,724 | B2 | 4/2016 | Lewis, II et al. |
| 10,091,552 | B2 | 10/2018 | Papish |
| 10,191,990 | B2 | 1/2019 | Sayyadi-Harikandehei et al. |
| 2009/0103887 | A1* | 4/2009 | Choi ............... G06V 10/772 382/118 |
| 2014/0245336 | A1* | 8/2014 | Lewis, II ........... H04N 21/4826 725/14 |
| 2016/0274744 | A1 | 9/2016 | Neumann et al. |
| 2017/0134776 | A1* | 5/2017 | Ranjeet ............. G11B 27/031 |
| 2020/0077151 | A1 | 3/2020 | Swerdlow et al. |

OTHER PUBLICATIONS

Allen Yu, "How Netflix Uses AI, Data Science, and Machine Learning—From A Product Perspective", Feb. 27, 2019, 22 pages.
Josefina Blattmann, "Netflix: Binging on the Algorithm", UX Planet, Aug. 2, 2018, 10 pages.

* cited by examiner

*Primary Examiner* — Kunal Langhnoja
(74) *Attorney, Agent, or Firm* — Dorsey & Whitney LLP

(57) ABSTRACT

Various embodiments for recommending and displaying content are disclosed. In one example, a method is disclosed that includes generating a first set of content portions from a plurality of content portions based on a plurality of metadata tags in a user profile, wherein the content portions are a subset of frames of a content item; displaying the first set of content portions in an interface provided to a user device corresponding to the user profile; filtering the first set of content portions based on one or more filter inputs to generate a filtered set of content portions; and transmitting the at least one content portion in the filtered set of content portions to the user device for presentation to the user.

20 Claims, 13 Drawing Sheets

CONTENT NAVIGATION AND PERSONALIZATION

TECHNICAL FIELD

The present disclosure relates to content transmission and consumption, including streamed content to user devices.

BACKGROUND

Content, such as movies and television shows, may be transmitted to user devices over a network. This has been made possible by content streaming where packets of compressed content files are encoded by a content server and decoded for playback by an application on a user device, e.g., media player. Such content distribution has created a shift in how content can be accessed. Prior to streaming, content was either broadcasted indiscriminately over channels or recorded onto physical media (e.g., digital video disks and video tape). Currently, content is accessible through software applications, e.g., streaming platforms, where the content is presented through a graphical user interface (GUI) and users may browse content either through navigation of the interface or by text-based search (e.g., directly input or spoken by the user).

While content streaming has allowed for "on-demand" access of content and has allowed users to access a much larger catalog of content, the increase in content has made it difficult for users to find relevant and enjoyable content. Most streaming platforms are designed for users who know exactly what they want to watch and in some instances users may have difficulty uncovering engaging content easily. For example, merely relying on marketing or text searches by the user to identify desirable content may lead many users to struggle to identify desirable content. Descriptive information for selectable content typically takes the form of large, illustrative, GUI tiles, while physical constraints of user devices limit the portion of a GUI that can be displayed in view at one time, requiring extensive scrolling and menu navigation to discover content. Additionally, text-based searches typically are only effective when inputted search terms match predefined index terms, which can require iterative keyword guessing to find relevant content items. As a result, navigation can be highly non-intuitive, and content discovery can be overly time-consuming.

Furthermore, many content streaming platforms offer full length content, e.g., movies, television shows, or the like, and if a user wishes to only view a portion of the content, such as a user's favorite scene, the user typically must manually navigate to the location within the full length content. For example, to watch a favorite scene in movie 1, a user must input a text search for "movie 1" in the platform search function, select the movie 1 from the list of search results, begin playback of movie 1 and utilize fast forward and rewind controls to navigate to the desired location within the movie. Often, there is not a way for users to save such scenes for later consumption or access and the time intensive process must be repeated every time a user wishes to view the scene.

SUMMARY

In one example, a method is disclosed that includes generating a first set of content portions from a plurality of content portions based on a plurality of metadata tags in a user profile, wherein the content portions are a subset of frames of a content item; displaying the first set of content portions in an interface provided to a user device corresponding to the user profile; filtering the first set of content portions based on one or more filter inputs to generate a filtered set of content portions; and transmitting the at least one content portion in the filtered set of content portions to the user device for presentation to the user.

In another example, a non-transitory computer readable medium including executable instructions for a method is disclosed. The instructions for the method include generating a first set of content portions from a plurality of content portions based on a plurality of metadata tags in a user profile, wherein the content portions are a subset of frames of a content item, displaying the first set of content portions in an interface provided to a user device corresponding to the user profile, filtering the first set of content portions based on one or more filter inputs to generate a filtered set of content portions, and transmitting the at least one content portion in the filtered set of content portions to the user device for presentation to the user.

In yet another example, a system is disclosed. The system includes a processor, a network interface in communication with the processor, and a memory store including instructions executable by the processor to perform a method, the method including generating a first set of content portions from a plurality of content portions based on a plurality of metadata tags in a user profile, wherein the content portions are a subset of frames of a content item, displaying the first set of content portions in an interface provided to a user device corresponding to the user profile, filtering the first set of content portions based on one or more filter inputs to generate a filtered set of content portions, and transmitting the at least one content portion in the filtered set of content portions to the user device for presentation to the user.

DETAILED DESCRIPTION

Figure 1:
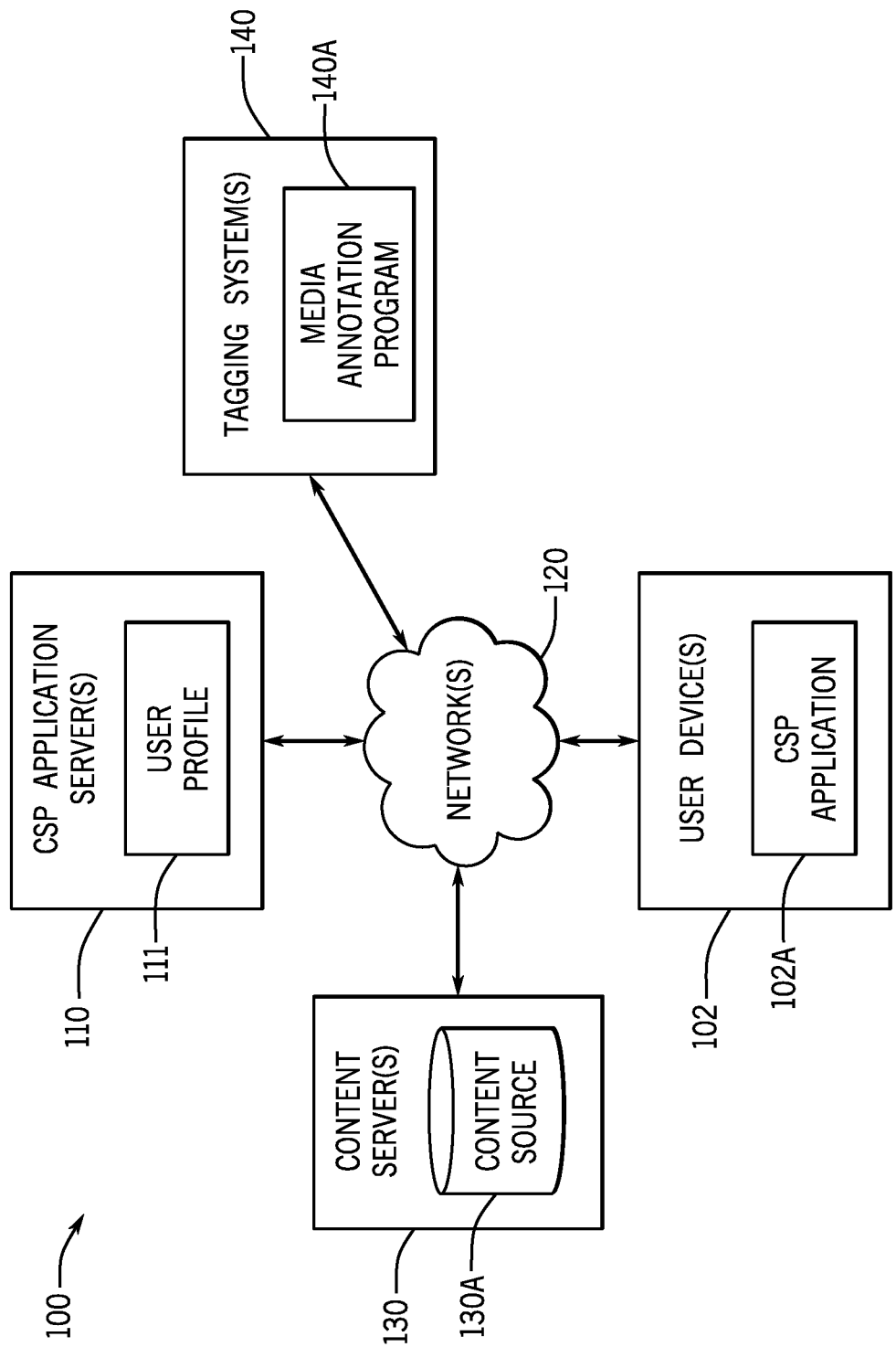
FIG. 1 illustrates a system for providing a content consumption platform according to various embodiments.

As described herein, various systems, methods, and computer-readable media for content navigation, discovery, personalization and/or recommendations on a content consumption platform, such as a content streaming platform, are disclosed. In various embodiments, the system can introduce users to content items that align with the user's interests, previous behavior patterns, and/or preferences, while also providing easy access to known (e.g., favorite) content. To give users an easy and efficient way to navigate, engage with, and discover content items, a content portion (e.g., scene-based) playlist is generated. The user can select content, including content portions, such as scenes or clips, for playback via the playlist. The playlist can be modified or filtered based on different user preferences and adaptive feedback that can dynamically modify the playlist or create specialized playlists for certain user preferences, behavior, categories, or the like. In this manner, the system can identify content portions that may be appealing to the user at a particular point in time (e.g., based on the user's mood, time of day, prior accessed content), or the like. The identified content portions, which may be scenes, clips, or otherwise a subset of frames from a content item, may then be presented to the user via the adaptive playlist.

In some instances, the system may recommend content portions, such as a subset of frames (e.g., scene or clip) from a content item, where the content portion includes features corresponding to the user's current preferences and/or feedback. For example, content portions may be tagged or indexed with information that may be used to match a content portion with a playlist (where the playlist characteristics may be dynamic based on user preferences and feedback). As the user engages with playlist, e.g., selects content portions for playback or passes on other content portions, the playlist can dynamically adapt and recommend different content portions for inclusion in the playlist.

In many embodiments, the playlist may utilize content portions rather than full content items. For example, the playlist may curate scenes based on a user's preferences at a given point of time and present scenes that satisfy the user preferences, rather than full content items. This display of a subset of frames allows the user to customize the content based on dynamic preferences, e.g., if a user wants to view only funny content, the playlist can generate a list of funny scenes, allowing a user to quickly view multiple funny scenes without having to separately navigate to different full length content items and then navigate to a desired scene. Additionally, the system may link to the full length content from which the content portion is contained and a user can easily continue consuming the content item event after the content portion has terminated. Further, the system may allow access to a larger variety of content based on the tagging and recommendations of content portions. For example, certain full length content items may not otherwise qualify for a particular user preference, e.g., the whole content item may not be a "funny" video, but discrete portions of the content item may qualify for the particular preference (e.g., funny scene in a dramatic movie) allowing the system to access and provide a larger portion of content for consumption by the user.

In some embodiments, the system may utilize both content portion metadata (e.g., scene-level metadata) and content item metadata (e.g., title content metadata) to determine content portions for recommendation to the user. For example, content item metadata may be applicable to the content item as a whole, e.g., content item genre (drama, comedy, fantasy), story archetypes (e.g., time travel, affair, search for meaning), subjects (e.g., family, travel, educational), setting (e.g., urban, wilderness), era (e.g., contemporary, Dark Ages, war), and/or agents or key characters (e.g., princess, superhero, pilot, etc.). The content item metadata may classify the content item and apply to all content portions within the content item and act to apply broad filters to the content portion selections. The filtering of content portions done by applying content item metadata may then be further filtered by analyze the content portion specific metadata. For example, the system may analyze all content portions to identify those included within a content item that is part of a "superhero narrative." Then, based on a user preference to view only funny scenes from such options, the system may select only content portions (e.g., scenes) from the generated list to present to the user a personalized playlist of funny scenes from superhero narrative content items.

As mentioned, by recommending and providing content portions, the system may allow easier and more fluid content engagement by allowing a user to transition directly to from a scene to a full-length content item, such that there may be a low-barrier to entry into full-feature content. Furthermore, a user may add content to a personal watchlist or playlist for customization and increasing engagement at later points in time.

As used herein "streaming" may refer to a method of transmitting and receiving content data over a computer network as a flow of packets. In streaming, packets of data can be played back in real-time while remaining packets are still being transmitted from the source (e.g., content server) in a steady, continuous stream. A "content streaming platform" may refer to a software application for displaying, organizing, transmitting and/or executing playback of streaming media, in particular, streaming content files.

A "content item" or "title content" may refer to a full length or full-feature content, e.g., content comprised of multiple scenes formed of a plurality of frames and typically configured for consumption as a whole, e.g., a movie or television shown. A content portion, such as a "scene" may refer to a group or subset of frames within the full length content item, such as a unit of story that constitutes a single narrative idea that can stand on its own or frames that correspond to one another thematically, such as by sharing a common background or location, or being directed to the same event (e.g., series of actions). Scenes may end with changes in locations, character, and/or conflicts, though a scene can also be a sequence of separate scenes that are intercut with each other for an effect, such as a cross-cutting montage between different characters in different situations that are thematically linked or action sequences that cut between different locations depicted in a content file. In the context of content playback, a content portion, such as a scene may take form of, or be contained or portrayed in, a "media segment", which may be a segment or portion within the content item, as defined by the time codes or frame numbers at which the portrayed scene begins and ends, e.g., "scene boundaries." Content portions may sometimes be referred to as "clips." Additionally a "shot" may refer to a sequence of content frames captured from a unique camera perspective without cuts or other cinematic transitions. A title content may be segmented into several scenes of varying lengths. A "scene category" may refer to a particular descriptor class for a scene descriptor. A scene category may be implemented as a class of metadata that a descriptive metadata tag belongs to.

As used herein, the term "content portions" is meant to encompass all types of selections or subsets of a content item, including for example, a plurality of frames, that is less than the full length content and may typically be tied together, such as a shot, scene, or clip. The content portions may be identified and optionally segmented or saved as discrete files or may be identified for playback based on timing codes or frame numbers within the full length content. In some instances, content portions may be identified manually and/or automatically (e.g., computer vision, deep learning, or other machine learning techniques). Examples of identifying content portions encompassed herein include those described in U.S. Pub. No. 2018/0005041 titled "Systems and Methods for Intelligent Media Content Segmentation and Analysis," filed on Jun. 30, 2016, which is incorporated by reference for all purposes herein.

"Metadata" may refer to data that provides information about other data. In the context of content streaming, metadata may describe a content file or media file, including portions thereof. A "metadata tag" may refer to a keyword or term assigned to data it describes or portions thereof, such as by applying a label to a file. For example, a metadata tag may refer to a classification of what is portrayed (e.g., substance, characters, plot, story, etc.) in the content file it is assigned to. "Title-level metadata" or "content item metadata" may refer to metadata associated with or tagged to a content item, e.g., a particular full-feature content or title content. "Content portion metadata" or "scene-level metadata" may refer to metadata associated with or tagged to a content portion, such as a media segment containing a particular scene (e.g., a particular scene included in a full-feature content or title content). The term "metadata" as used herein is meant to encompass all types of metadata, including title-level and/or scene-level metadata.

A "profile" of a user or "user profile" or "user data" may encompass information about the user, which may include general account information (e.g., login information, contact information, demographic information), as well as input user preferences and/or detected user information (e.g., user viewing activity, browsing activity, or the like). For example, a profile may include a history of content selected by the user, content that has been consumed or played back by the user, the duration of playback for the content selected or watched by the user, as well as any other activity within the streaming content platform, such as navigation commands and text-based search inputs, and any accompanying metadata associated therewith. Further, the user profile may include other user information, such as, but not limited to, age, location, input user preferences (e.g., favorite characters, favorite movie types, etc.). Some of the information in the user profile or user preferences may be directly input by the user, while other data may be collected or determined over time automatically by the system.

"Data filtering," "information filtering," or "filtering" may refer to identifying a portion or subset of a larger set of data. For example, one type of information filtering may be that of a "recommender system," which uses predictions in order select from items (e.g., products, movies, songs, various forms of content, etc.) based on ratings and/or user preferences. In some examples, content-based filtering and collaborative filtering may use the combination of item features and recorded user interactions to recommend or filter content items to users based on measured similarities, such as by mapping features as vectors in Euclidean space, calculating a distance or similarity metric between them, and algorithmically selecting items that are measurably close to or "near" data relating to the user or content items consumed by the user (e.g., using k-nearest neighbors or tree-based algorithms).

A "playlist," "content list," or "suggestion list" may refer to a list or set of content portions and/or content items compiled together. A playlist may include the data both to describe and optionally locate the content items, e.g., information about the content items, where the content items are located or may be retrieved from a server or other storage location, playback points for content portions in the playlist, and/or the order or sequence in which the content items are to be played in the playlist. For example, a playlist file may comprise a plurality of uniform resource locations (URLs) identifying web addresses where listed content items may be accessed from a content server. Examples of playlist file formats may include m3u, m3ui, asx, or other XML style or plaintext playlist format, to name a few.

Turning to the figures, FIG. 1 illustrates a system for distributing contents through a content consumption platform, such as a content streaming platform. System 100 may include a content service provider (CSP) application server 110, a network 120, a user device 102, a content server 130, and a tagging system 140. For simplicity in describing embodiments, reference will be made to singular instances of each component in system 100; however, it is noted there may be multiple CSP Application servers 110, user devices 102, users, content servers 130, and tagging systems 140 involved in system 100. Although FIG. 1 illustrates an embodiment in which CSP application server 110 and content server 130 are separate servers, in one embodiment, CSP application server 110 and content server 130 may be the same server. In one embodiment, CSP application server 110 and tagging system 140 may be the same component. In another embodiment, content server 130 and tagging system 140 may be the same component.

Data exchange, such as sending and receiving of formatted data messages using standard communication protocols, may be facilitated between the participating computing devices of system 100 and delivered over network 120. Network 120 may include any number of communication networks, such as a cellular network or mobile network, local computer network, global computer network, or global system of interconnected computer networks, such as the internet. CSP application server 110 may be a server that hosts an application and its corresponding logic and functionality and facilitates the access of resources, handling of requests, and processing of data. Specifically, CSP application server 110 may host logic for a content service provider (CSP) application 102A, which may be implemented as a content streaming platform or content consumption platform on user device 102. In embodiments, CSP application server 110 may manage a user profile 111, which includes information corresponding to the user. User profile 111 may include user data, including input user data (e.g., input preferences and user information), as well as detected or determined user information (e.g., a watch history or viewing history of user, learned user preferences) as well as other behavior of interaction within CSP application 102A by user. Although user profile 111 is depicted in FIG. 1 as stored at or by CSP Application server 110, in one embodiment, a local copy of user profile 111 may be stored on user device 102 (either in addition to or separate from a version stored on the CSP Application server 110).

User device 102 may be a computing device operated by user, including any number of mobile devices (e.g., smart phone, laptop computer, tablet, wearable, or vehicle), entertainment devices (e.g., game console, media player, or smart TV), or any number of computing devices (e.g., desktop computer, set top box) supporting content management and/or playback. In embodiments, the user device 102 may include components and capabilities for supporting functionality of a content service provider or local application 102A, including image and content display functionality, input/output devices (e.g., display, speaker or other audio output device, touch interface, press button switches, microphones, cameras, and other sensors), one or more network interfaces (e.g., Wi-Fi, Bluetooth, near-field communication, mobile phone network interface, cellular data communication interface, etc.), one or more memory storage devices, and one or more computer processors.

The user device 102 may include a CSP application 102A, which may be an application stored in memory of the user device 102 and executable on the user device 102. CSP application 102A may comprise code for providing content services, such as code for a content streaming platform used to deliver content for consumption by user. CSP application 102A may comprise computer code for providing and displaying an interface or graphical user interface (GUI) that can be used to navigate content and initiate playback of selected items. CSP application 102A may further comprise computer code for a media player, such as a content player configured to execute playback of content files, including streamed content or locally stored content. For example, CSP application 102A may include code for a standard content codec (e.g., H.264, VP9, AAC, MPEG-14) and code for performing methods of HTTP streaming, such as adaptive bitrate streaming, formatting, and playlisting methods (e.g., HTTP Live Streaming [HLS], Dynamic Adaptive Streaming over HTTP [MPEG-DASH], Common Media Application Format [CMAF], or any combinations thereof).

Content server 130 may include one or more processing elements for delivering content over a network, e.g., stream content portions and content items. For example, content server 130 may be a content delivery network (CDN) or content distribution network of servers, proxy servers, data centers, and memory stores used for caching, storing, locating, and retrieving content items and metadata thereof. Content server 130 may be configured to respond to requests for a content item by locating, or identifying an address of, a content source 130A where the content item is stored, which may be a location or network address where requested content items can be accessed from and delivered to user device 102. Although content source 130A is illustrated in FIG. 1 as being located in or co-located with content server 130, in various embodiments, content source 130A may be in a location separate from content server 130, and content server 130 may be configured to access or retrieve content items from the content source 130A or redirect requests to the content source 130A (e.g., using global server load balancing, DNS-based routing, HTTP redirects, URL rewriting, anycasting, CDN peering, or combinations thereof). Content source 130A may be configured as a data center, database, cache, or other memory store. In some instances, some content portions and/or content items may be stored locally on the user device 102 or another device in communication with the user device 102. Content items and metadata may be stored in content source 130A as retrievable or readable data files, including, to name a few examples, database entries, HTML pages, JavaScript files, stylesheets, images, contents, or portions thereof. Transmission of content items from content source 130A to user device 102 may be initiated by CSP application server 110 and CSP application 102A and facilitated over network 120 between user device 102, CSP application 102A, CSP application server 110, content server 130, and/or content source 130A.

Tagging system 140 or identification system may include one or more computers for identifying information about content portions and content items, e.g., metadata tagging of content items available on a content streaming platform, such as content available for consumption by user via user device 102 and CSP application 102A. In embodiments, tagging may be implemented as manual tasks, automated tasks, or combinations thereof. For example, a tagging process may involve humans identifying scene boundaries for discrete scenes in a content item and adding metadata tags to associated content portions for such scenes. The tagging system 140 may also comprise an automated program, or "media annotation program" 140A, configured for tagging (e.g., using computer vision, deep learning, or other artificial intelligence (AI) based methods).

In some instances, the tagging process may include a combination of artificial intelligences or machine learning techniques based media annotation programs 140A and human reviewers that provide refinement of tagging, labeling of data, training of automated systems, or other forms of assistance, quality assurance, and review. For example, media annotation program 140A may include one or more supervised, unsupervised, and semi-supervised learning models, which may be trained to recognize patterns in image data indicative of a particular label. The labels may be selected from predetermined metadata tags and metadata tag types or classes, and the trained models may be configured to tag a file (e.g., a content item or content portion) with the label when the file contains the indicative image data or recognized pattern, e.g., via a best fit analysis. Initial labels may be applied to a set of training data by human annotators, and human reviewers may be involved in both training, testing, and retraining of the media annotation program 140A and the models contained therein. Examples of learning models may include convolutional neural networks, support vector machines, clustering, long short-term memory models, recurrent neural networks, to name a few non-limiting examples. Examples of a media annotation program 140A of tagging system 140 may be found at: U.S. Pat. No. 10,694,263B2 titled "Descriptive Metadata Extraction and Linkage with Editorial Content," filed on Nov. 1, 2018 and U.S. Pat. No. 9,846,845B2 titled "Hierarchal Model for Human Activity Recognition," filed on Nov. 21, 2012, both of which are incorporated by reference herein for all purposes.

In one embodiment, the media annotation program 140A may ingest content files and identify (e.g., mark) the beginning and ends of content portions, such as scenes, resulting in a content item segmented into several content portions of varying lengths (e.g., segmenting the content item into a plurality of subsets of frames). For example, the time codes or frames associated with the beginning and ends of a content portion (e.g., scene) may be stored in a database and associated with metadata regarding both the content item and the content portion (e.g., plot lines, characters, summary of the scene, etc.). In this manner, the system may store metadata tags corresponding to both the content item, content portion, as well as the playback or start/ending information for playback of the content portion within the content item.

Metadata tags generated and applied to content portions and content items by tagging system 140 may include content portion or scene-level metadata tags, which may be used by CSP application server 110 to recommend content portions and generate a content portion or scene-based playlist including the recommended content portions (e.g., scenes) for presenting on user device 102. In embodiments, a variety of metadata is utilized to support delineation of content portions from within the content item, e.g., algorithmic generation of playlists based on user profile 111, as well as retrieval of content portions based on inputs provided to an interface of CSP application 102A. The metadata may include temporal data, e.g., metadata assigned at specific points in time within a creative work or tagged for discretely bounded content portions within a content item, such as a title content, can be created using the media annotation program 140A of tagging system 140 and by human metadata taggers. The metadata may be leveraged to inform content portion recommendation and playlist compilation.

In one example, to define a scene or other content portion, human metadata taggers and/or AI-based media annotation programs of tagging system 140 may identify the boundaries of all content portions available from content source 130A, such as movies and television episodes, e.g., identify the start and end time codes or frames for scenes within the content item. Some scenes and longer sequences may be broken up into smaller portions, or "sub-scenes," based on larger shifts in story or locations. In embodiments, CSP application server 110 may be configured to present and save content portions based on the identified boundaries, as the boundary data may be stored along with other metadata for the content item.

For matching user information in user profile 111 to content portions, e.g., to suggest or recommend content portions, a default set or first set of content portions may be recommended based on data in the user profile 111 that may be indicative of interests of user, e.g., based on user input information or demographic information, average typical content portion recommendations, or the like. For example, if a user is an adult in the 20-35 year range, the system 100 may recommend a first set of content portions corresponding to content portions most popular within the user's age group (based on information collected across the system 100 and multiple users).

As user selects and consumes content items through CSP application 102A, the system 100 will track and improve the initial sets of content portions suggested to the user, i.e., the system 100 will have a feedback process to improve and enhance the recommendations, based on user activity, allowing for dynamic and varying content portion recommendations. As one example, the occurrence of metadata tags for a scene category present in the content items viewed by user may be flagged and prioritized in user profile 111 by CSP application server 110. For example, if the user's viewing behavior includes a frequent occurrence of scenes categorized as "mood: romantic" and a frequent occurrence of scenes categorized as "activity: sword fighting," then the content portions prioritized would be content portions tagged with metadata tags having scene categories of "romantic" and "sword fighting." If user does not have an established viewing history in user profile 111 (e.g., user has watched little or no content on a content streaming platform), then user's default set of content portions may be based on the most frequently occurring metadata tags for the entirety of viewing histories in user profile 111 or entirety of user profiles 111 of system 100 (e.g., viewing histories of other users or cumulative viewing history for the entirety of users of a content streaming platform or based on user profiles with similar user characteristics). The first set of content portions is provided in an interface of CSP application 102A. In embodiments, user may provide inputs to user device 102 and self-select content items in the first set of content portions using selectable options, e.g., scene categories, provided by the interface. As a result of the user inputs, the CSP application server 110 may generate a filtered set of content portions for display on the user device 102.

The user may also be recommended new content that user has not watched, as indicated in user's viewing history in user profile 111. The most frequently occurring metadata tags present in content items viewed by user may be matched to similar content portions that user has not viewed. For example, CSP application 102A may receive a selection to save a scene in a content item (e.g., title content) and determine scene-level or other content portion metadata tags associated with the saved scene. The CSP application server 110 may add the determined scene-level or other metadata tags to user profile 111 and identify highest priority scene-level metadata tags from user profile 111 (e.g., most frequently occurring metadata tags present in the viewing history of user).

A filtering or recommendation method may then be used to select one or more content portions similar to the identified highest priority metadata tags. The filtering method may include a recommender system filtering method, such as content-based filtering or collaborative filtering. As an example, the metadata tags for each content portion may be vectorized as features and a similarity metric (e.g., cosine similarity) may be used to determine content portions having a feature vector close to the highest priority scene-level metadata tags in user profile 111. A selection algorithm (e.g., tree-based search or nearest neighbors) may be configured to select the content portions sufficiently similar to the highest priority metadata tags, and that optionally have not been viewed by user. For example, the selection algorithm may be configured to identify a set of candidate content portions based on measured similarity and select a candidate media segment in the set which is not logged in user's viewing history in user profile 111. As such, content portions, such as scenes within a content item, e.g., title content, not yet viewed by user that match metadata tags of high interest or high priority may be shown and recommended to user through the interface of CSP application 102A.

For defining certain metadata categories, e.g., scene categories for content scenes, the metadata may be classified or identified as belonging to a particular class of metadata to a particular type of metadata tag. In embodiments, these metadata classes may include "character" type metadata tags (e.g., character type in the content item, such as alien, super hero, princess, etc.), "mood" type metadata tags (e.g., type of mood or feeling conveyed by the content portion, e.g., funny, sad, romantic, suspenseful, fearful, etc.), "joke" type metadata tags (e.g., funny, physical comedy jokes, satire, etc.), and "activity" type or "event" type metadata tags (e.g., sword fighting, swimming, chase scene, gun fight, dance break, song, etc.).

In some examples, the metadata tags may be applied for all content portions within the content item. For example, the "character" class, tagging system 140 may tag the appearance of every named character across multiple content items and portions thereof, e.g., within title content, scenes, and sub-scenes. The "character" type metadata tags may be used by CSP application server 110 to present content portions based on characters that user repeatedly views and to allow user to select characters whose scenes they want to view. Similarly, for the "mood" class, tagging system 140 may generate and apply a taxonomy of moods in annotating one or more primary moods identified in each media segment presented. Some non-limiting examples of "mood" type metadata tags may include "amazement," "confessional," "romantic," "sad," "uplifting," and "wild." The "mood" type metadata tags may enable scenes to be algorithmically selected by CSP application server 110 based on data in user profile 111, including past user behavior or user-selected scenes based around a desired mood to be retrieved. For the "activity" or "event" class, tagging system 140 may generate and apply a taxonomy of activities and events in annotating one or more activities identified in each media segment presented. Some non-limiting examples of "activity" type or "event" type metadata tags may include, "dancing," "kissing," "swimming," "sword fighting," "audition," "birthday," "prom," and "Valentine's Day." The "activity" and "event" type metadata tags may enable content portions to be automatically identified by the CSP application server 110 based on data in user profile 111, including past user behavior or user-selected scenes based on interest in particular activities or events. For the "joke" class, tagging system 140 may generate and apply humor and subject taxonomies in annotating the presence of one or more jokes identified in each media segment presented. Some non-limiting examples of "joke" type metadata tags may include, "insult," "physical humor," "sight gag," and "wordplay" and metadata tags that indicate a topic or subject of a joke, including, "sports," "social issues," "romance," and "parenting." The "joke" type metadata tags may enable scenes to be algorithmically selected by CSP application server 110 based on data in user profile 111, including past user behavior or user-selected scenes based on interest in a particular type of humor or a particular topic of humor.

For defining higher-level attributes that may be used in combination with temporal metadata, tagging system 140 may tag content items with content item or title-level metadata, which may define what the content item is about based on one or more characteristics including an overall, high level, and/or time independent characteristics, e.g., characteristics corresponding to the content item as a whole. In one embodiment, the title-level or content item metadata may not be user-facing or presented as a selectable filter in an interface of the CSP application 102A. Instead, the content item or title-level metadata may be used in combination with the temporal metadata by CSP application server 110 to define user preferences and assist in the curation of content portions of scenes in a generated playlist. Examples of title-level metadata classes may include "genre" type metadata tags (e.g., drama, comedy, fantasy), "story archetype" type metadata tags (e.g., time travel, search for meaning, affair), "subject" type metadata tags (e.g., family, travel, educational), "setting" type metadata tags (e.g., urban, wilderness), and "era" type metadata tags (e.g., contemporary, World War II, Dark Ages), as well as "agent" type metadata tags that describe a type for the important characters/agents portrayed in a title content or the type of protagonist portrayed in the title content (e.g., princess, superhero, pilot, baseball player, twins).

In some embodiments, to give a user an easy and efficient way to navigate, engage with, and discover content items, a content portion (e.g., scene) playlist is provided to the user device 102 through CSP application 102A and CSP application server 110. When selected, an individual content portion, such as a scene, will play from a curated, data-driven playlist generated based on scene-level or content portion metadata tags associated with the content portion. The playlist can be modified or filtered based on different user preferences. A default playlist may be generated based on user profile 111, including a viewing history of user and/or other user characteristics within the user profile. A content portion depicting a particular scene may be auto-played (e.g., played upon generation and display of the scene-based playlist) through an interface provided by CSP application 102A, by way of CSP application server 110 initiating execution of playback of corresponding content items in the playlist. For example, a playback process may comprise sending a signal from CSP application server 110 to CSP application 102A causing user device 102 to request from content server 130 content items listed in a playlist file and streaming the content items obtained from content source 130A according to information specified in the playlist. In embodiments, the playlist may be filterable by user through a playback interface provided by the CSP application 102A.

In this manner, the system 100 may introduce a user to new content items or content portions that align with his or her interests or previous behavior patterns, while replaying some of user's favorite content items. By playing content portions, such as scenes, the system 100 may further enable content engagement by allowing user to transition directly to a full-length content item or title content from an associated content portion (e.g., scene from within the title content), such that there may be a low-barrier to entry into full-feature content. Further, the transition to the full content items may allow a user to view personalized "trailers" for content items, e.g., the content portions presented to the user may be tailored to the user's interests and help them become interested in viewing the entire content item in the same way trailers or teasers area meant to do, but are tailored to the specific user rather than a broad category of people.

Furthermore, in certain embodiments, a user may add content portions to a playlist for customization and increasing engagement at later points in time. Additionally, in some embodiments, a link may be generated during playback of a media segment to share the playlist to other users through the CSP application 102A or through other media platforms, amplifying discovery of content items. In other embodiments, a link may be generated to co-watch the content in a group session and group playback interface hosted by CSP application server 110, allowing synchronized playback functionality of CSP application server 110 and inviting other users to engage. The content portion playlist provides a digestible entry into full-length content or title contents that both celebrates a user's most enjoyed content items and introduces new content to a user based on past behavior, thereby improving navigation, engagement, and discovery of content items on a content providing system, e.g., streaming platform.

Figure 2:
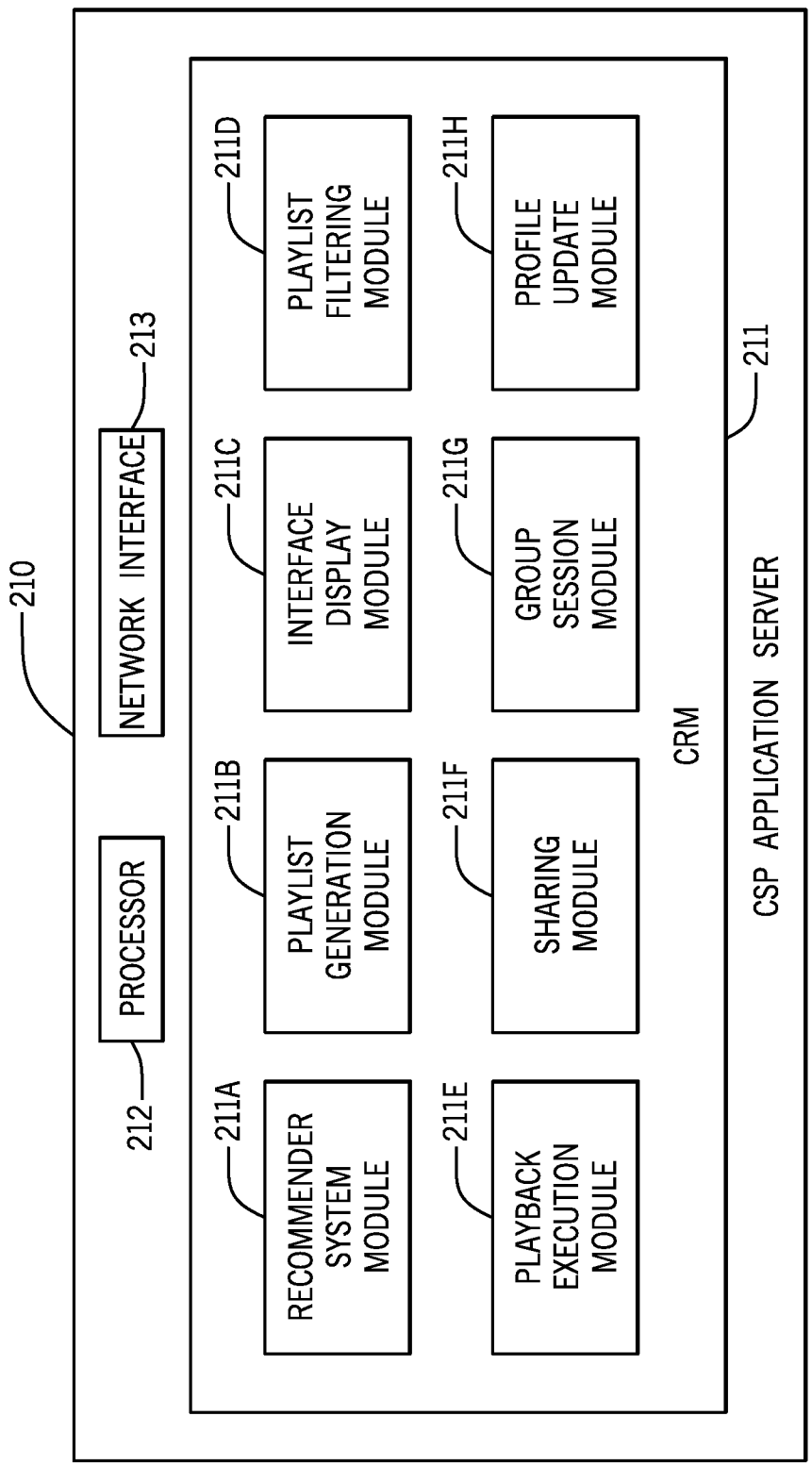
FIG. 2 is a functional block diagram of a content server according to various embodiments.

FIG. 2 is an example of a functional block diagram of a content service provider (CSP) application server according to embodiments. CSP application server 210 may be the same server as CSP application server 110 of system 100 depicted in FIG. 1. CSP application server 210 may include one or more of a processor 212, a network interface 213, and a non-transitory computer-readable medium (CRM) 211 storing instructions executable by the processor. Processor 212 may comprise one or more computer processing units (CPUs), one or more graphics processing units (GPUs), or any combination thereof that are sufficient to receive and execute instructions, such as software code. Network interface 213 may comprise an interface for sending, receiving, formatting, and reformatting messages through network 120 of FIG. 1. CRM 211 may comprise one or more memory stores, which may include non-transitory computer readable media, such as random-access memory (RAM), dynamic random-access memory (DRAM), read-only memory (ROM), hard disk drive (HDD), solid state drive, flash memory, or any combination thereof. In embodiments, the instructions may be implemented as modules of code, including recommender system module 211A, playlist generation module 211B, interface display module 211C, filtering module 211D, playback execution module 211E, sharing module 211F, group session module 211G, and profile update module 211H. It should be noted that although multiple modules are show in FIG. 2, the system 100 may include fewer or more modules than shown, and the illustration of FIG. 2 and corresponding description is meant to be illustrative only.

Recommender system module 211A may comprise code for applying one or more recommendation algorithms or filtering methods to data collected from a content streaming platform. In delivering a recommendation, this may include code for determining a frequency of occurrence of a metadata tag in user profile 111 and weighting the content portions associated with metadata tags (e.g., scene-level metadata tags) frequently occurring in the profile (e.g., pertaining to content most frequently viewed by the user). This may include weighting based on different classes of metadata tags, such as heavily weighting specific scene-level metadata tags and slightly weighting title-level metadata tags in a recommendation algorithm. For example, if a user history in user profile 111 indicates that the user likes funny action sequences involving airplanes, the recommendation algorithm may select and recommend content portions that correlate to funny action sequences involving an airplane, per associated metadata tags and established weights, readily and easily engaging the user in new content without requiring user to view an entire content item which, in some instances, may only contain a single occurrence of the scene type user may be interested in.

Recommender system module 211A may further comprise code for recommending scenes or content portions as a sequence or as a set of content portions, where a user may choose to watch a content item, e.g., a title-content, corresponding to a given content portion in the set or may choose to watch a different content portion in the set, such as the next recommended content portion in the generated or compiled playlist. Examples of suitable recommendation methods implemented in code of recommender system module 211A may include content-based filtering, collaborative filtering, and supervised or regression-based personalization algorithms. For example, metadata tags associated with the content portions and the content items may be mapped as features in Euclidean space, and content portions similar or "close to" metadata tags present in user's profile may be candidates for selection into a recommended playlist. The predetermined weights may then be used to prioritize and select from the candidate content portions and compile the selected candidates into a playlist file for recommendation to user through CSP application 102A on user device 102.

In one embodiment, the frequency of occurrence of metadata tags that are "preferred" by a user (e.g., routinely selected by the user such as selected over a threshold number of instances or indicated as a preference by the user) for content portions or content items may also be weighted in the recommendation algorithm of recommender system module 211A. This may include recommending a content item that contains multiple content portions tagged with scene-level or content portion metadata tags that user is more interested in, e.g., those that the user responds more quickly or readily. That is, content items containing content portion metadata tags or scene-level metadata tags that are frequently viewed by user may be prioritized in a recommended playlist. As such, recommender system module 211A may include code for determining a frequency of occurrence of different metadata tag, such as scene-level metadata tags, in a content item and weighting content portions of a content item that has a threshold number of scene-level metadata tags frequently occurring in user profile 111.

In another embodiment, recommender system module 211A may include code for determining a frequency of occurrence of title-level or content item metadata tags in the viewing history of user and weighting content portions of a content item associated with most frequently occurring title-level metadata tags in user profile 111. That is, content portions related or similar to content items viewed by user may also be prioritized in a recommended playlist. In one embodiment, scene-level metadata tags may be weighted such that content portion metadata tags or scene-level metadata tags that are more important to the scene or content portion are weighted more heavily than other scene-level metadata tags that are less important in the scene. For example, a scene-level metadata tag for a character or for an action in the scene may be more important than a scene-level metadata tag for an object in the background of a scene, and as such, may be weighted more heavily.

Playlist generation module 211B may include code for generating a set or listing of content portions, where the set may include references to the content portions and/or links thereto. The playlist general module 211B may include code for formatting a sequence of content portions as a playlist file, including code for generating a first set of content portions based on a plurality of scene-level metadata tags in user profile 111. Additional details regarding generation of a recommended playlist are described with respect to the discussion of FIGS. 5A-5C further below. Code for generating a playlist may include code for receiving a user selection to save a scene in a content item (where the boundaries of the scene may be already determined or may be dynamically selected by the user, e.g., user defined scenes), determining scene-level metadata tags associated with the content portion, and compiling a list of content portions having similar scene-level metadata tags into a playlist file.

In one embodiment, the order that content portions (e.g., scenes) are presented in the playlist may be defined by highest number of views of the content portion by other users on the system 100 (e.g., all other users or users with similar profile characteristics to the user). This may help to ensure new content portions presented to the user before substantial user feedback has been received are more likely to be enjoyed by the user. As users apply additional filters or feedback (e.g., increase user history), the weight of the priority sequence for a particular content portion may change. For example, if a scene includes all filter categories and is highest in number of views by the general population, then it would be sequenced earlier in the playlist than another scene. In one embodiment, the content portions may be compiled in a random order. In another embodiment, the content portions may be or organized according to priority. In embodiments, the playlist file may contain web addresses for content items for each media segment contained in the set, such as URLs identifying the location of the content source 130A.

Interface display module 211C may include code for generating and providing an interface for display on a user device. This may include code for displaying a set of content portions in an interface provided by CSP application 102A on user device 102 to user. Interface display module 211C may also include code for providing image files and displaying images contained therein, including artwork for content items, animated previews of content items, and depiction of scenes or other elements contained within content portions. The interface may be configured to display a set of scene categories, which in one embodiment, may be configured as a set of drop-down menus. A scene category in the set of scene categories may correspond to a particular class of scene-level metadata tags (e.g., activity, event, mood, franchise, and character) and filter inputs may be selectable from the scene category. For example, a filter input may be a selection under a drop-down menu for a given scene category and the filter input may correspond to a scene-level metadata tag within the particular class it is selected from. For example, the filter input may be a selection by user to filter scenes in a recommended playlist based on a specific activity, event, mood, franchise, or character. In this manner, the interface display module 211C may further include code for generating and displaying an interface of CSP application 102A based on filter inputs or other user preferences received from user device 102, which may include an interface for displaying a filtered set or curated content portions. Additional details regarding interfaces of CSP application 102A are described with respect to the discussion of FIGS. 3A, 3B, 3C, 3D, 3E, 3F, and 3G further below.

Playlist filtering module 211D may include code for applying metadata tag filters to filter or refine a playlist based on user inputs to an interface. This may include code for receiving filter inputs from user device 102 via CSP application 102A, and filtering a set of content portions based on received filter inputs to generate a filtered set of content portions. The filter inputs may be selected from a set of scene categories selectable from the interface generated using code of interface display module 211C. In embodiments, a scene category in the set of scene categories may correspond to an associated class of metadata and contain metadata tags of that type. As such, playlist filtering module 211D may further include code for receiving a filter input, matching the filter input to a specific scene-level metadata tag, and filtering a playlist such that only content portions tagged with the specific scene-level metadata are included in the playlist.

Playback execution module 211E may include code for initiating playback of content portions and/or content items on a device of user. This may include code for encoding and streaming of content files, in accordance with system 100 described in FIG. 1 above. In embodiments, this may include code for transmitting and optionally executing playback of at least one media segment in a playlist file configured as a filterable set of content portions and playing the next media segment in a playlist sequence. This may further include code for receiving an indication to play a content item (e.g., title content) relating to one of the content portions in the playlist file and executing playback of the content item, which may include determining a time code or frame associated with a playback point of a content portion currently being displayed and setting the time code or frame associated with the playback point as a current playback point for the content item (e.g., title content). As such, when executing playback of the content item from within the playlist interface, playback may start at the playback point that continues from the current portion, such as the current scene.

Sharing module 211F may include code for generating links for sharing a playlist. This may include code for receiving an indication to share a filterable set of content portions and generating a link to the full set or a set of content portions pre-filtered by user using CSP application 102A. The link may be sent by a first user device to a second user device, where the two user devices may correspond to different users, and may be configured to execute playback of the content portions in an interface provided to the second user device by CSP application server 210. For example, the link may be an executable hyperlink that maps to an address where a configured playlist file can be retrieved or referred to by an instance of CSP application 102A.

Group session module 211G may include code for facilitating a synchronized viewing session between multiple user devices 102 running instances of a content streaming platform. This may include code for receiving an indication to watch a set of content portions in a group user interface by CSP application server 210 and transmitting and/or executing playback of the set of content portions in the group user interface. The group user interface may be linked to multiple users devices in a group session hosted by CSP application server 210, with the users being able to view the set of media segment through an instance of CSP application 102A running on the respective user device 102.

Profile update module 211H may include code for updating a profile of a user (i.e., the user profile). This may include code for updating user profile 111 based on a completed viewing duration of selected content portions. This may also include code for updating user profile 111 based on user inputs made to user device 102 by user through an interface provided through CSP application 102A and CSP application server 210 (e.g., provided using code of interface display module 211C). In embodiments, after updating user profile 111, CSP application server 210 may generate a new playlist containing new scenes based on the updated user profile 111.

FIG. 3A, FIG. 3B, FIG. 3C, FIG. 3D, FIG. 3E, FIG. 3F, and FIG. 3G are illustrative GUIs for the system 100. It is noted, that FIGS. 3A, 3B, 3C, 3D, 3E, 3F, and 3G are merely for illustrated purposes and the components shown may be arranged differently in other implementations, such as by altering the position or display configuration of the user interface elements, e.g., while a drop down menu is shown, the same functionality may be implemented as a freeform text input or button selection. The GUI and portions thereof may be an interface of CSP application 102A on user device 102 and provided by CSP application server 110/210. In some instances, visual elements and objects of the illustrated GUI may be used to initiate programmed commands and exchange of data between user device 102 and CSP application server 110/210.

Figure 3A:
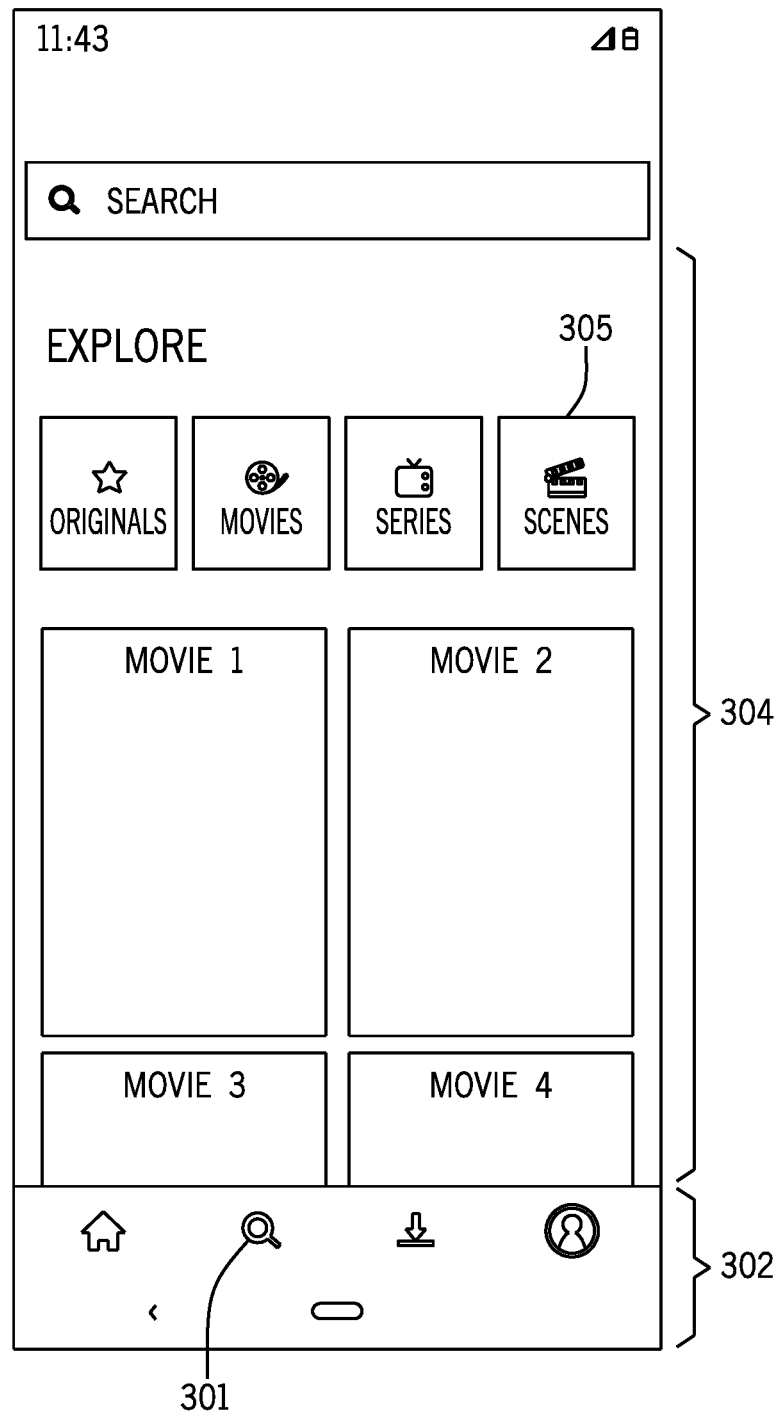
FIG. 3A illustrates an access scenes graphical user interface according to an embodiment.
Figure 3B:
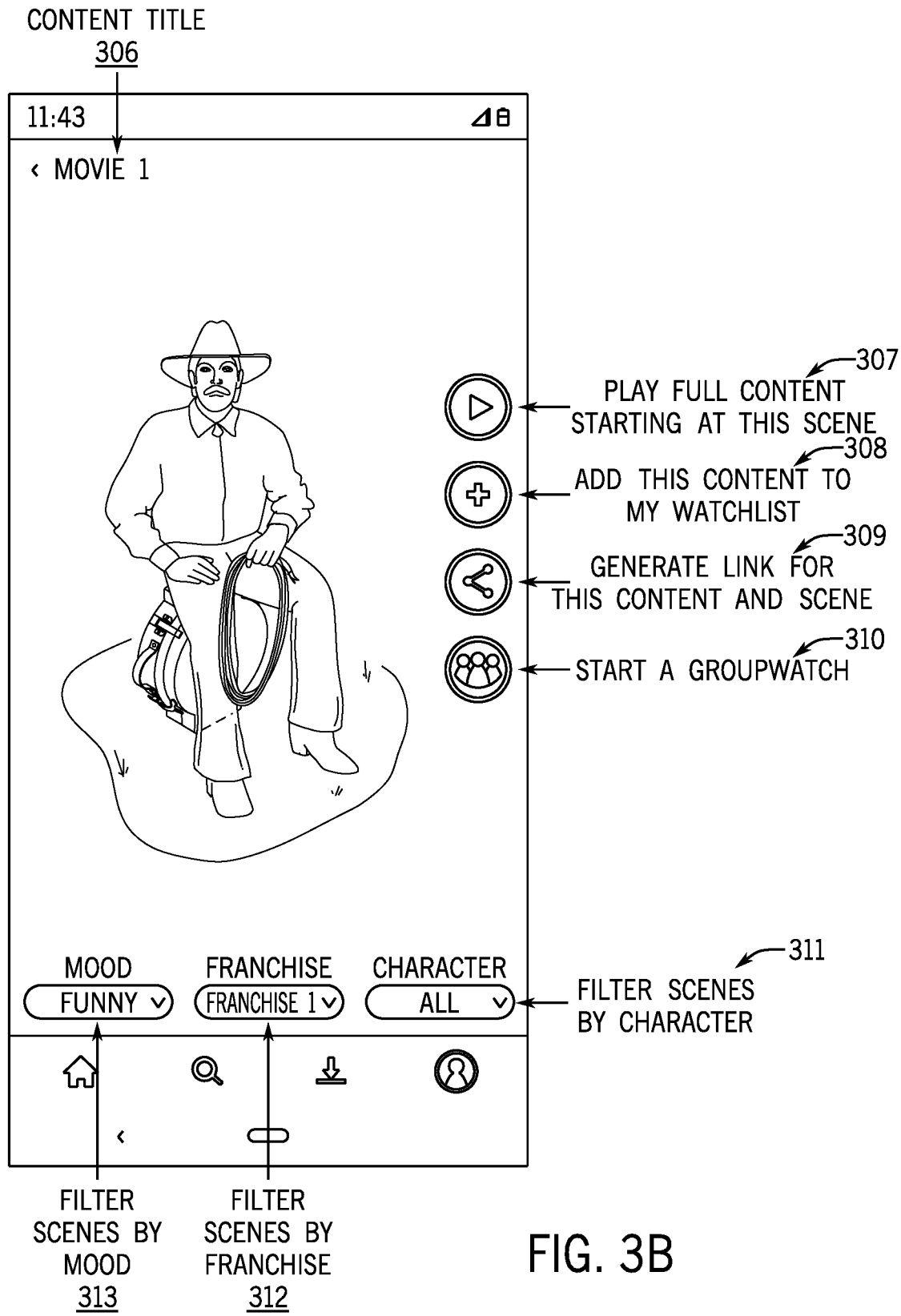
FIG. 3B illustrates a scene player navigation graphical user interface according to an embodiment.

With reference to FIG. 3A, an access scenes GUI is used to allow a user to identify and provide input regarding different content portions that the user is interested in viewing. For example, the user can select the search icon 301, which may be in the form of a button or other graphic, from the main navigation bar 302 of the access scenes GUI. In the explore menu 304, the user can select the scenes icon 305 and the GUI may proceed to the next interface, e.g., a scene player navigation GUI as illustrated in FIG. 3B. In one embodiment, from the scene player navigation GUI of FIG. 3B, scenes or content portions may begin playing automatically using a recommendation algorithm based on the user's viewing history, as described earlier above. The user may select or "tap" on a first portion of the scene player navigation GUI (e.g., the right side of the interface) to skip to the next scene or content portion, and tap on a second portion of the scene player navigation GUI (e.g., the left side of the interface) to play the previous scene or content portion. In embodiments, selecting or skipping to the next content portion, e.g., next scene, may initiate playback of consecutive content portions in a playlist sequence. A title 306 of the content item (e.g. the title of the content item for the content portion) currently playing may be displayed. A selectable option to navigate back to the explore menu 304 (e.g., a back arrow) may also be provided.

In one embodiment, additional selectable options (e.g., icons such as buttons) may also be provided. In the example of FIG. 3B, the selectable options include a 'play full content' icon 307, an 'add to watchlist' icon 308, a 'share' icon 309, and a 'group watch' icon 310. In other embodiments, one or more of these selectable options may be excluded, or addition selectable options may be included. With continued reference to FIG. 3B, in one embodiment, selecting the 'play full content' icon 307 will exit the content portion player and begin playback of the content item, e.g., title content, relating to the content portion that was being played on the scene player. In one embodiment, playback of the content item may start at the content portion (e.g., scene) that was being played at the time the scene player was exited. In another embodiment, playback of the content item may start at the beginning of the content item. In various embodiments, the option for the playback location of the content item may be presented to the user or may be selected based on a user preference for the same. Selecting the 'add to watchlist' icon 308 adds the content item to the user's watchlist or playlist. In some embodiments, the user may have a plurality of watchlists or playlists. In such cases, selecting the 'add to watchlist' icon 308 will give the user the option to select which watchlist or playlist the content item will be added to. Additionally, in one embodiment, user profile 111 may include viewing restrictions (e.g., parental controls for children) and CSP application server 110 may automatically filter out any content items and/or content portions based on such restrictions. Selecting the 'share' icon 309 copies a sharable URL link to the particular scene player filters at the current content portion, which may be generated according to the instructions of sharing module 211F of CSP application server 210. Selecting the 'group watch' button 310 allows multiple users to watch together, such as using synchronized viewing functionality of CSP application server 110/210 and according to the instructions of group session module 211G. In one embodiment, selecting the 'group watch' button 310 may also initiate playback at the current content portion. In one embodiment, selecting the 'group watch' button 310 may further initiate playback of a filtered playlist, according to the currently selected filters.

Figure 3C:
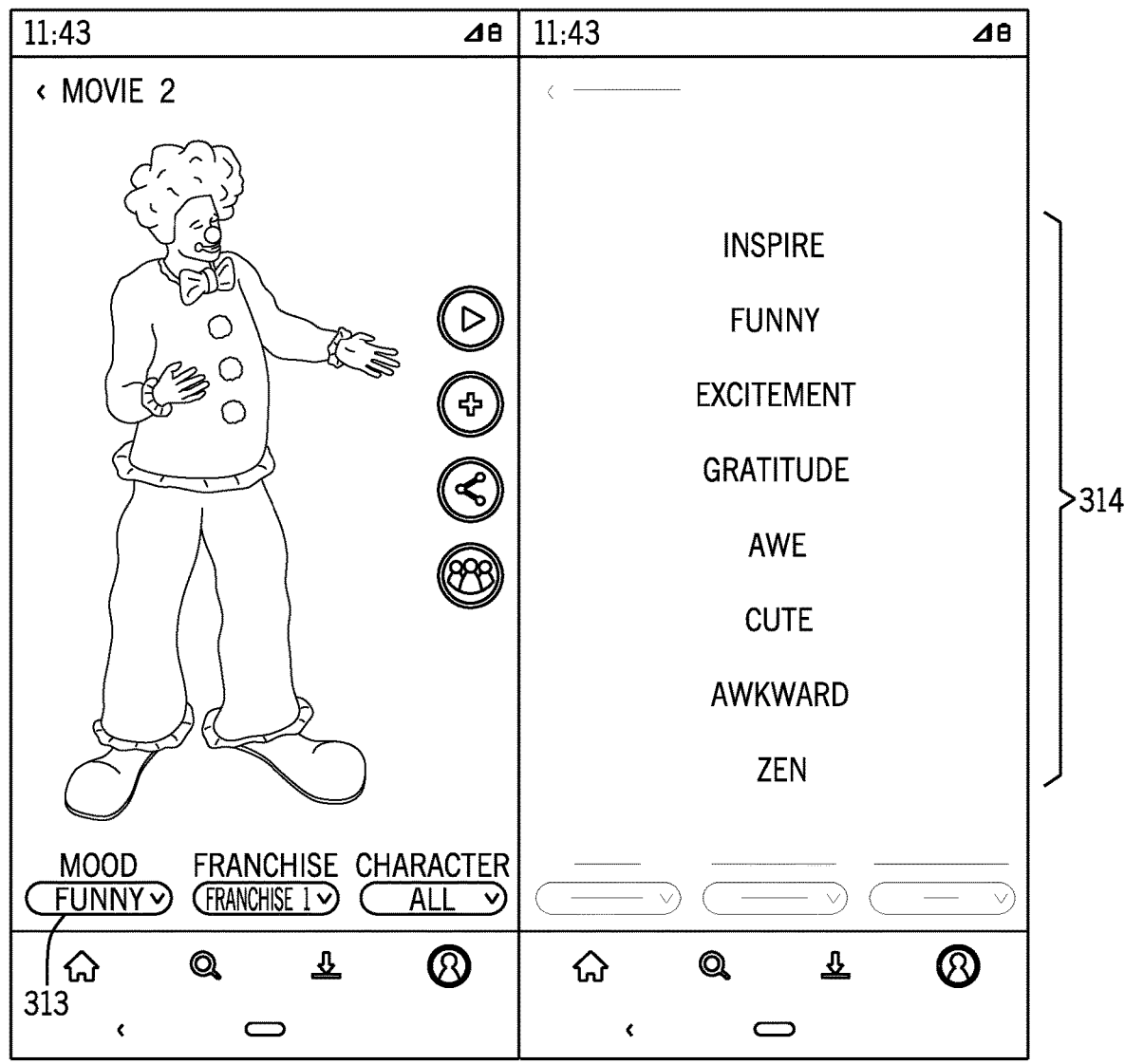
FIG. 3C illustrates a mood filter customization graphical user interface according to an embodiment.
Figure 3D:
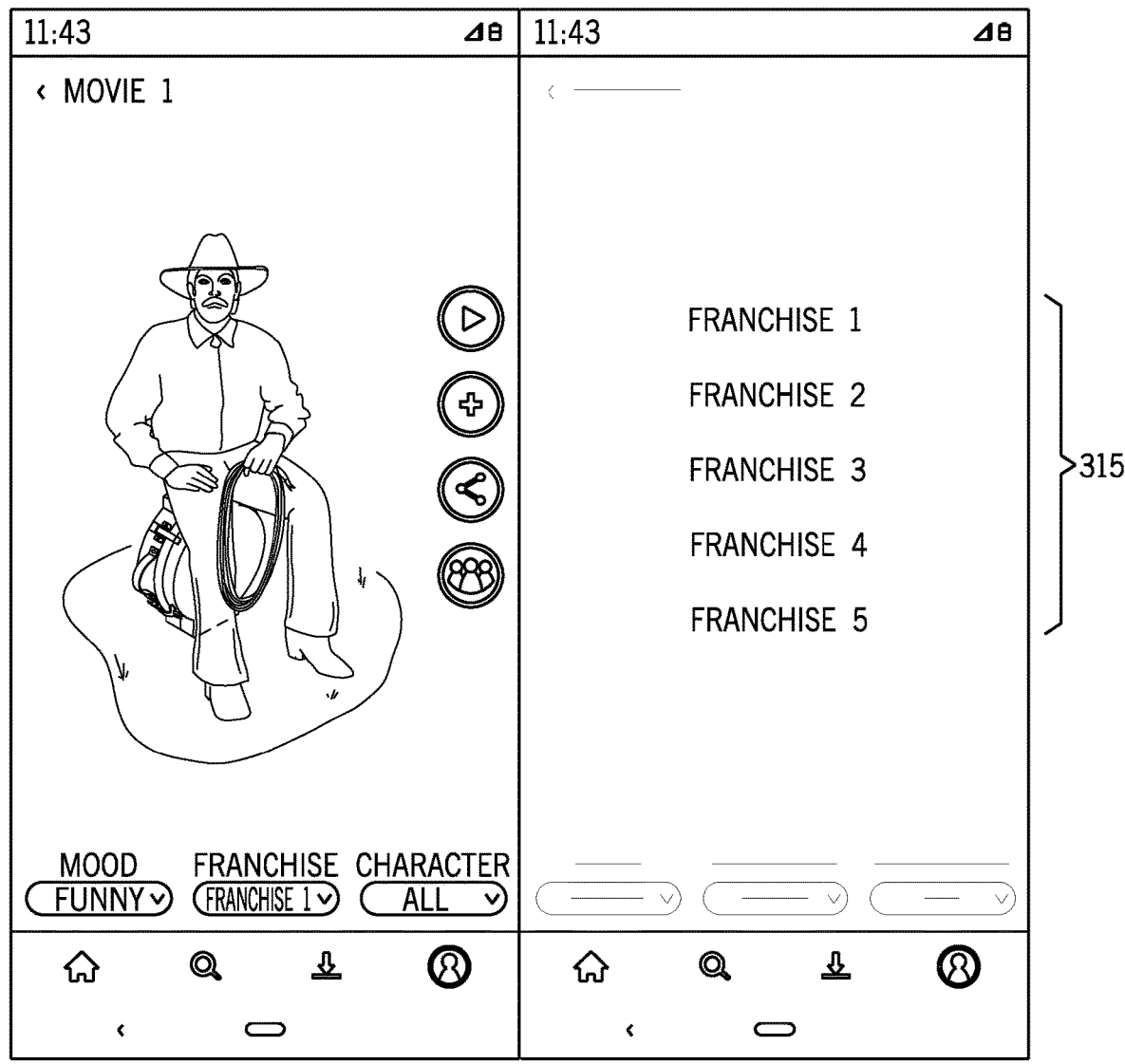
FIG. 3D illustrates a franchise filter customization graphical user interface according to an embodiment.
Figure 3E:
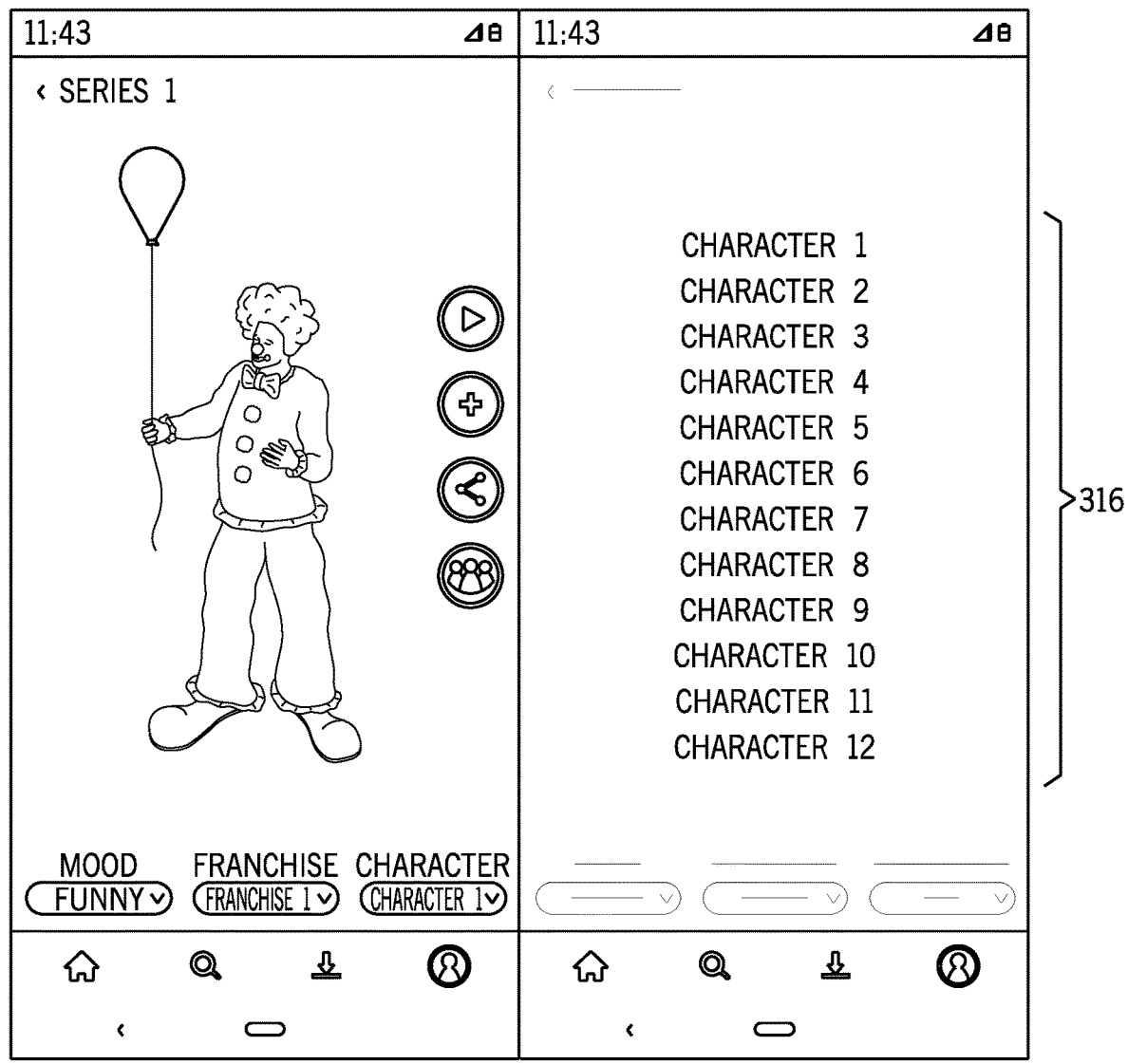
FIG. 3E illustrates a character filter customization graphical user interface and action customization graphical user interface according to an embodiment.

The user may select from scene categories implemented, for example, as drop down menus or other selectable icon, including "character filters" menu 311, "franchise filters" menu 312, and "mood filters" menu 313. In other examples, one or more of these filters may be omitted, or additional filters may be added. Selecting from the scene categories may signal CSP application 102A and CSP application server 110 to proceed to the next display, e.g., mood filter customization GUI, as illustrated in FIG. 3C. The mood filter customization GUI may allow a user to select or input user preference for the "mood filters" menu 313 to display a list of available mood filters 314. Selecting a particular mood filter may filter all content portions in a generated playlist to match the selected mood, e.g., content portions with a metadata tag for mood that does not match the selected mood may be eliminated from the presented playlist. The filtering may be performed according to the instructions of playlist filtering module 211D of CSP application server 210. As illustrated in FIG. 3D, a user selects from the "franchise filters" menu 312 to display a list of available franchise filters 315. Selecting a particular franchise filter may filter all content portions in a generated playlist to match the selected franchise. As illustrated in FIG. 3E, a user selects from the "character filters" menu 311 to display the list of available character filters 316. Selecting a particular character may filer all content portions in a generated playlist to match the selected character.

In one embodiment, a character filter may be associated with a particular franchise filter, and if a franchise filter is selected from the franchise filter customization GUI illustrated in FIG. 3D, character filters associated with the selected franchise may be the only ones available in the character filter customization GUI in FIG. 3E. In one embodiment, the GUI illustrated in FIG. 3E may also include an action customization GUI. A user may select an action icon to display a list of available action filters. Selecting an action filters content portions in a generated playlist to match the selected action. In one embodiment, a franchise or character may be associated with a set of available action filters, and if a franchise or character filter is selected, action filters associated with the selected franchise and character are those presented in the action customization GUI of FIG. 3E.

Figure 3F:
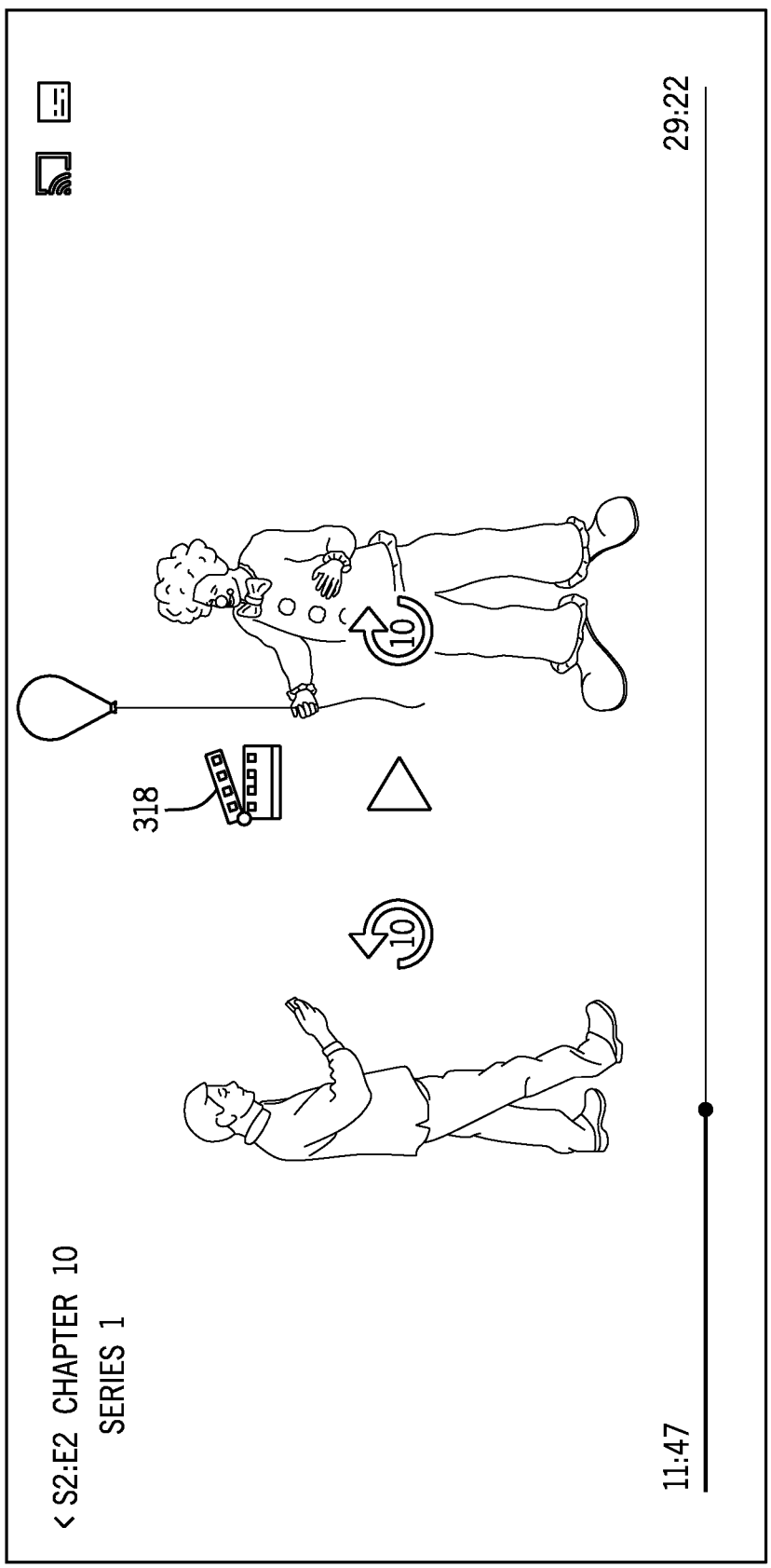
FIG. 3F illustrates a paused content playback graphical user interface according to an embodiment.
Figure 3G:
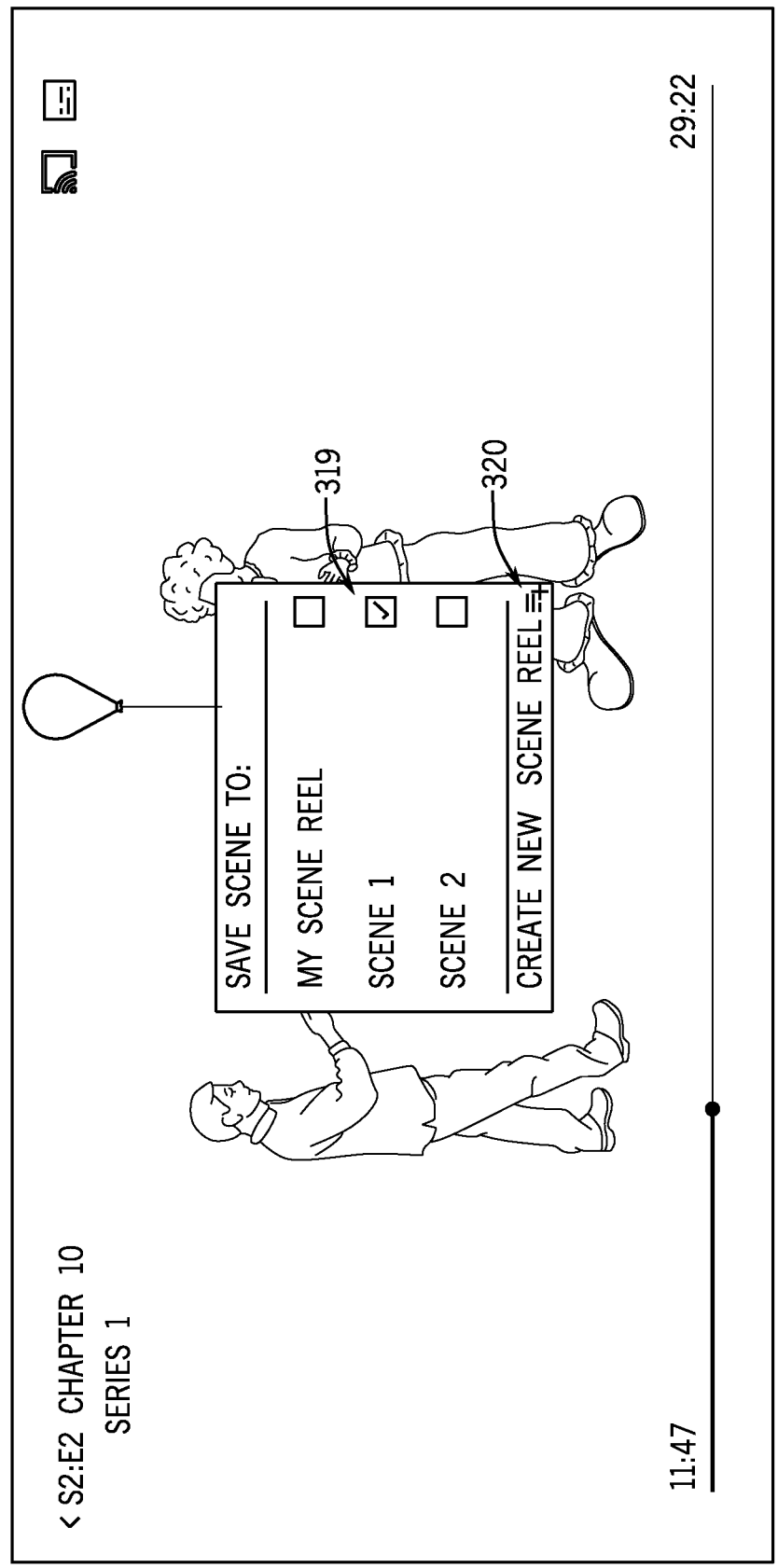
FIG. 3G illustrates a save scene graphical user interface according to an embodiment.

With reference to FIG. 3F, a paused content playback GUI may be used to retrieve content portions and/or content items. For example, during playback of a content item, users can save individual content portions, such as scenes, to scene reels (e.g., a playlist or watchlist) for quick access at a later point in time. To save a content portion, the user may pause the playback and select the "save scenes" icon 318. Upon pausing content playback and selecting the save scenes icon 318, the user may select a first set of content portions or any previously created set of content portions, as illustrated in FIG. 3G. In one embodiment, the default set or first set of content portions may be identified by a "My Scene Reel" icon 319. Additionally illustrated in FIG. 3G, the user may create a new set of content portions. In one embodiment, the new set of content portions may be identified by a "Create New Scene Reel" icon 320. Once a scene reel is selected, a user may select or "tap" on an icon to exit the player menu options.

Figure 4:
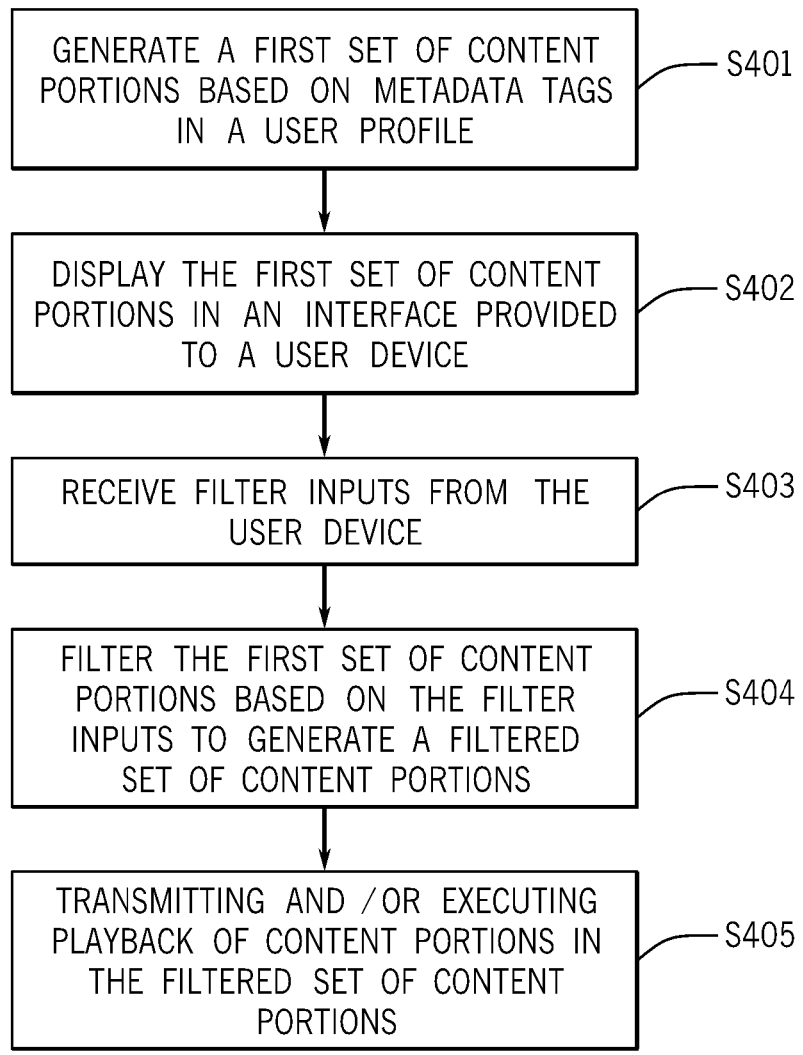
FIG. 4 is a flowchart of a method for content navigation and discovery on a content platform according to an embodiment.

FIG. 4 is a flowchart of a method for providing content portion based content navigation and discovery. The steps of the method may include step S401, generating a first set of content portions based on a plurality of metadata tags, e.g., scene-level meta data tags in a user profile of a user, S402, displaying the first set of content portions in an interface provided to a device of the user, S403 receiving one or more filter inputs from the device of the user, S404, filtering the first set of content portions based on the one or more filter inputs to generate a filtered set of content portions, and S405, transmitting and/or executing playback of at least one of the content portions in the filtered set of content portions. The method may be executed using system 100 of FIG. 1, and more specifically, by CSP application server 110/210 of FIG. 1 and FIG. 2.

In S401, a first set of content portions is generated based on metadata tags in a user profile, e.g., scene-level metadata tags. The first set of content portions may be an initial content playlist (e.g., a default playlist) that is generated for a particular user based on the user's viewing history logged in his or her profile or may be based on user characteristics. For example, metadata tags associated with content items or content portions that the user has viewed over the course of using a content platform may be mapped to content portions sharing the same or similar scene-level metadata tags.

In S402, the first set of content portions is displayed in an interface provided to a user device. In embodiments, a user may explore content by selecting a "scenes" icon on a CSP application running on the user's device. Selecting the scenes icon may initiate a scene playlist feature, displaying the user's personalized playlist of content portions (e.g., scenes) that was generated at step S401. An interface provided by the CSP application may display user selectable filter inputs selectable from a number of scene categories (e.g., as illustrated in FIG. 3B). The filter inputs may correspond to metadata tags describing moods, jokes, events, activities, franchises, and/or characters portrayed in the content portions (e.g., scene-level metadata tags) configuring the user's personalized scene playlist to be filterable according to the user's liking and preference.

In S403, filter inputs are received from the user device 102, e.g., as input by the user. From the scene categories provided by the interface displayed at step S402, the user may select his or her desired scene types for viewing, per filter inputs selected from within each scene category. The filter inputs may be formatted into a data message generated and delivered from the CSP application to the CSP application server so that a filtered playlist may be generated according to the filter inputs at step S404.

In S404, a filtered set of content portions is generated based on the filter inputs received from the user device. The user may select filter inputs as the user sees fit, which may include adding, changing, or removing filters previously selected. As the user selects a particular set or combination of filter inputs, data messages may be sent between the CSP application and the CSP application server so that the CSP application server may apply the selected filters to the user's default set and generate the desired filtered playlist.

In S405, playback of the content portions in the filtered set of content portions is executed. The CSP application and CSP application server may request content items for playback on the user device based on the information in the filtered playlist, such as by initiating streaming of denoted content portions from a content source to the user device. The metadata may be used to initiate playback at a desired location, e.g., the start of a particular scene, such that while the content item may be retrieved, the playback is a portion of the content item. The user may then view the content portions through the provided interface as they stream to the user device.

Figure 5A:
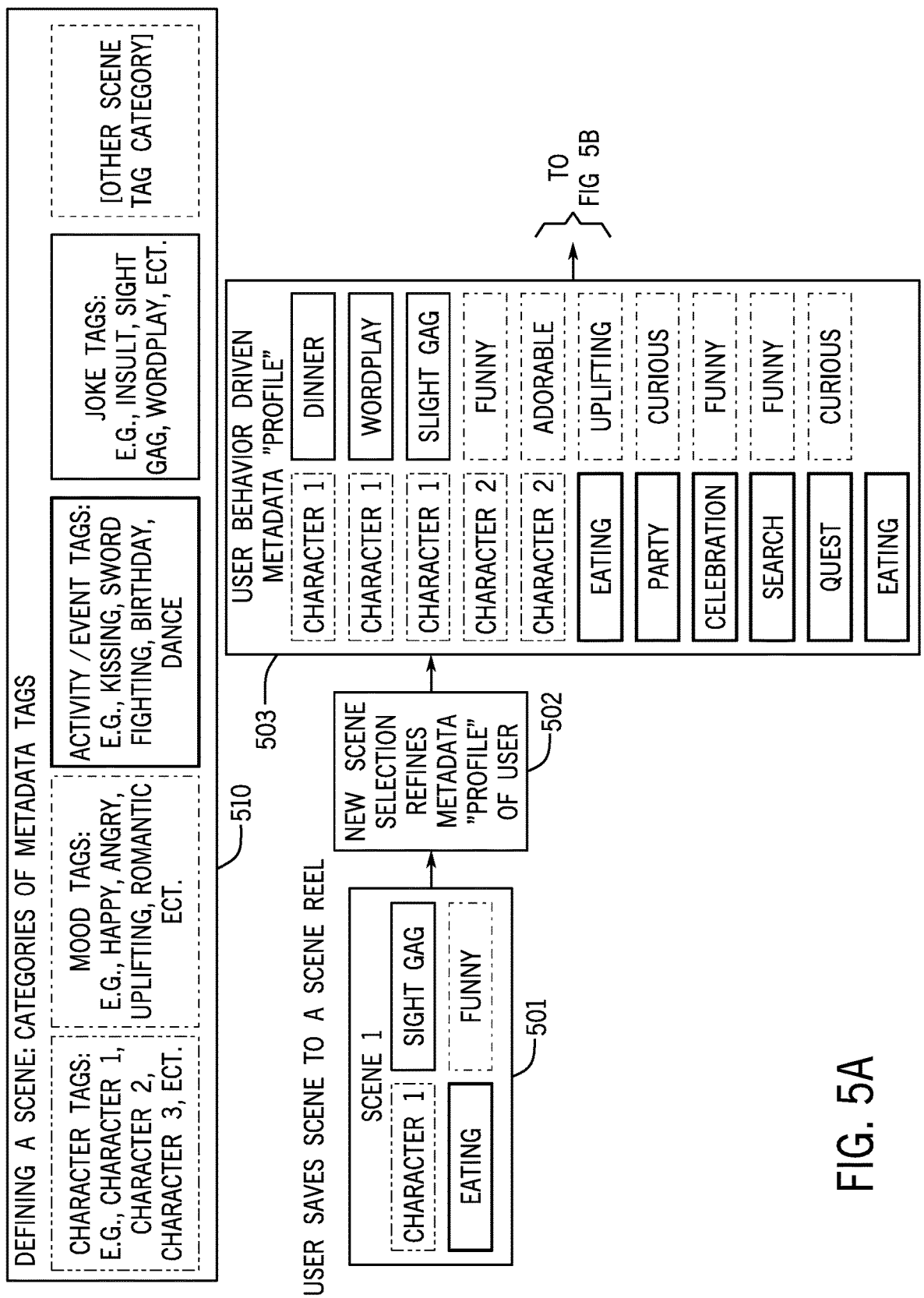
FIG. 5A is a flow block diagram for generating a set of content portions based on a plurality of metadata tags and a user profile according to an embodiment.
Figure 5B:
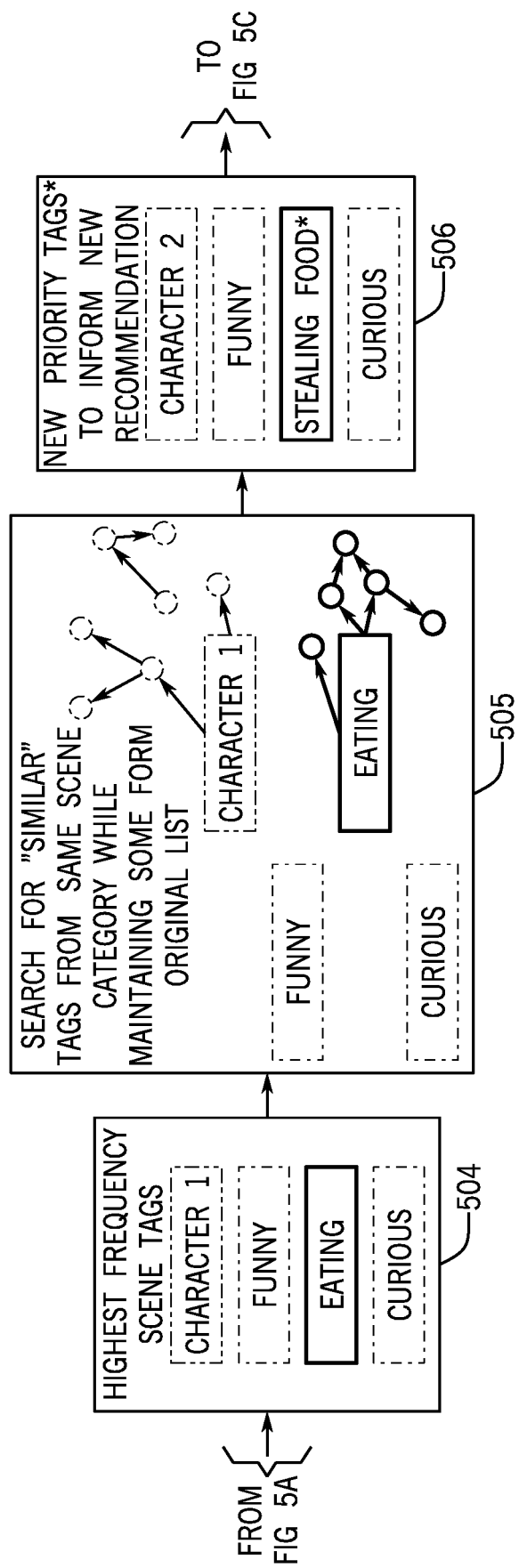
FIG. 5B is a continuation of the flow block diagram of FIG. 5A.
Figure 5C:
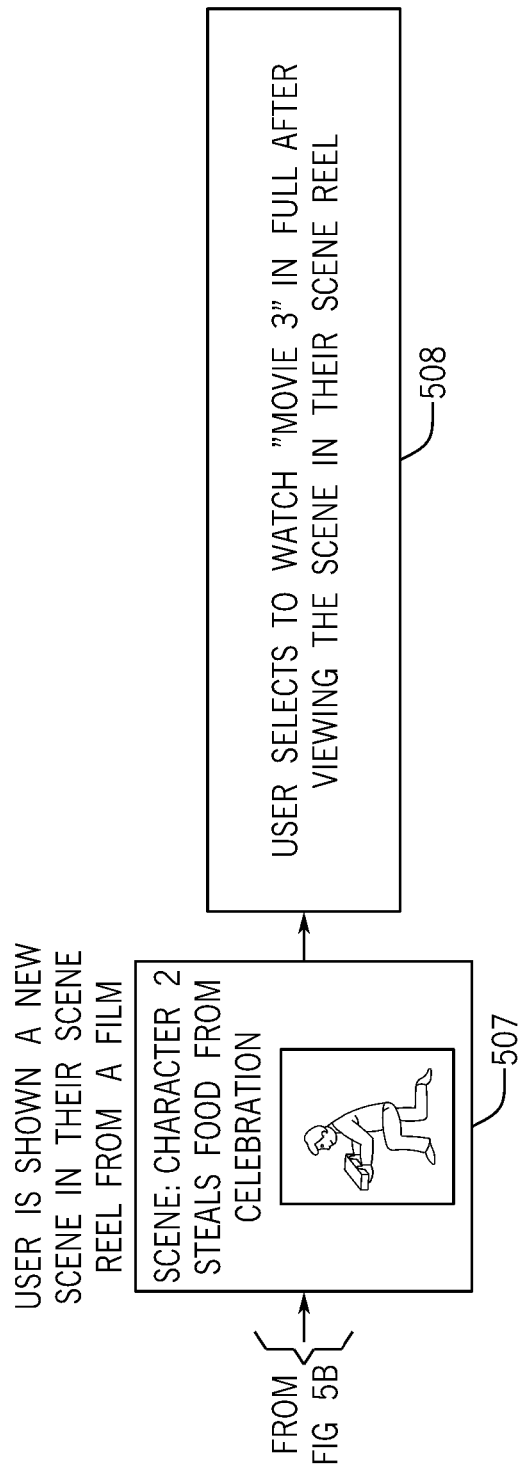
FIG. 5C is a continuation of the flow block diagram of FIGS. 5A and 5B.

FIGS. 5A-5C illustrate a flow diagram of generating a set of content portions based on a plurality of metadata tags and a user profile according to an embodiment. The process shown in FIGS. 5A-5C may be implemented by a CSP application server, such as CSP application server 110/210 of FIG. 1 and FIG. 2. At block 501, the CSP application server receives a selection to save a content portion, e.g., a scene, in a content item (e.g., a title content), which may be a selection made by a user, for example, in the GUIs depicted in FIG. 3F and FIG. 3G. The CSP application server updates and adds user preferences and characteristics to the user profile of the user based on the selection, and at block 502 CSP application server determines metadata tags 510 associated with the content portion selected.

As the user identifies and saves more content portions, the set of content portions may be refined. For example, at block 503, the CSP application server adds the determined metadata tags for the selected content portions to the user profile of the user. At block 504 (FIG. 5B), the CSP application server identifies highest priority scene-level metadata tags from the user's profile, which may include metadata tags most frequently occurring in the user's profile. In other words, the CSP application server may identify the metadata tags that are most likely to be of interest to the user by identifying metadata tags that are similar across multiple content portions. For example, if a user views and likes a particular content portion, that content portion may have multiple (e.g., 20 or more) metadata tags corresponding thereto. As the user continues to engage with the platform, the CSP application server can identify the metadata tags that overlap more frequently across multiple content portions. In other words, the CSP application server can identify over time the actual features of the content portions that the user enjoys by identifying recurring metadata tags or similarities between metadata tags over multiple content portions.

At block 505, the CSP application server searches for metadata tags similar to the highest priority metadata tags. The CSP application server may search for exact metadata term matches and similar metadata matches. Similar metadata matches may be identified by clustering metadata terms together in higher level classes (e.g. "punching" and "sword fighting" may be ground into a "fighting" cluster). Similar matches may also be identified based on degrees of similarity determined by definition, concomitance in overall data, or combinations thereof. For example, in graph, the mood metadata tags of "funny" and "whimsical" may be clustered closely together, metadata tags for "sexy" and "romantic" may be clustered closely together, and metadata tags for "dark" and "heartwarming" may be far apart.

At block 506, the CSP application server identifies new metadata tags and applies a filtering method, such as a recommender system filtering method, to select content portions similar to the identified highest priority metadata tags. At block 507 (FIG. 5C), the CSP application server compiles the selected content portions into a playlist file and executes playback of scenes contained therein through an interface on the user device 102. In one embodiment, the playlist file may be configured to contain only content portions from a content item the user has not viewed before on the platform. At optional block 508, the CSP application server receives a selection from within the interface as a content portion is being presented or played back. The selection may be a user input to watch the content item associated with the content portion currently being played, and playback for the content item may be executed, starting at a frame or time code associated with the displayed content portion.

Embodiments described herein provide users with an easy and efficient way to navigate, engage with, and discover content items by providing a behavior-driven scene-based playlist that can be modified and filtered based on different user preferences and inputs. Furthermore, embodiments may provide and refine recommendations based on content portion metadata, e.g., scene-level metadata, rather than solely based on full content item data (e.g., title metadata). By refining selections and recommendations of content based on content portions, rather than more broadly content items or full length content items, the user can more quickly be presented enjoyable and desired content. For example, in a convention streaming platform, a user searching for "bug" would be presented with only content items having "bug" in the title, whereas with the described systems and methods, a user searching for the same term would be presented with content portions having a bug in the corresponding metadata, e.g. a scene that includes bugs. Such refinement is not possible with full content item based searching and recommendation platforms, making it difficult for users to quickly and enjoyably engage with content.

By providing an interface configured to display a set of scene categories corresponding to a particular class of content portion metadata tags, filter inputs selected from scene categories in the interface generate a filtered playlist of content portions, e.g., scenes, and previews of content, allowing content discovery much faster. Furthermore, various embodiments enable continuous, easy content engagement on a content streaming platform by allowing a user to transition directly to a full-length content item from a content portion, such as a scene, as the content portion is played back from the interface. Playback of the full-length content item may begin from the playback point of the current content portion resulting in more efficient content navigation.

Although the system and methods have been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method comprising:
    generating, by an application executed by a processing element, a first set of content portions from a plurality of content portions based on a first plurality of predetermined stored metadata tags in a user profile, wherein each content portion includes a subset of frames of a content item;
    displaying the first set of content portions in an interface provided to a user device corresponding to the user profile;
    generating, by the application, new priority metadata tags based on a calculated similarity between the first plurality of predetermined stored metadata tags and content metadata tags in the first set of content portions, wherein at least one of the new priority metadata tags is different from the predetermined stored metadata tags;
    filtering the first set of content portions based on one or more filter inputs to generate a filtered set of content portions, wherein the one or more filter inputs include one or more of the new priority metadata tags; and
    transmitting at least one content portion in the filtered set of content portions to the user device for presentation to a user.

2. The method of claim 1, wherein the interface is configured to display a set of scene categories that correspond to the one or more of the new priority metadata tags.

3. The method of claim 2, wherein a filter input for the one or more filter inputs is selectable from the set of scene categories and wherein the one or more of the new priority metadata tags corresponds to a class selected from activity, mood, franchise, or character.

4. The method of claim 1, wherein each content portion comprises a scene from a respective content item.

5. The method of claim 1, wherein generating the first set of content portions based on the first plurality of predetermined stored metadata tags in the user profile comprises:
    receiving a user selection to save a content portion of the plurality of content portions from the content item to a playlist file;
    determining the first plurality of predetermined stored metadata tags associated with the content portion; and
    associating the first plurality of predetermined stored metadata tags with the user profile.

6. The method of claim 5, further comprising:
    identifying one or more highest priority metadata tags from the user profile;
    filtering the first set of content portions to select a second set of content portions similar to the highest priority metadata tags;
    compiling the second set of content portions into the playlist file; and
    transmitting the playlist file to the user device.

7. The method of claim 1, further comprising determining a frequency of occurrence of one or more metadata tags of the first plurality of predetermined stored metadata tags or the new priority metadata tags in the user profile, wherein generating the filtered set of content portions comprises weighting the content portions of the first set of content portions according to the frequency of occurrence of the one or more metadata tags in the user profile.

8. The method of claim 1, further comprising:
    determining a frequency of occurrence of one or more content metadata tags in one or more content items; and
    weighting content portions of the plurality of content portions having a threshold number of the content metadata tags most frequently occurring in the one or more content items higher than other content portions.

9. The method of claim 1, further comprising:
    determining a frequency of occurrence of title metadata tags in the user profile; and
    weighting content portions similar to most frequently occurring title metadata tags of the title metadata tags in the user profile higher than other content portions.

10. The method of claim 1, further comprising transmitting another content portion in the filtered set of content portions to the user device for presentation to the user.

11. The method of claim 1, further comprising:
    receiving an indication to play a content item including the at least one content portion; and
    transmitting the content item to the user device for presentation to the user.

12. The method of claim 11, further comprising:
    determining a time code or frame associated with a beginning of the at least one content portion within the content item; and
    setting the time code or frame associated with the beginning of the content portion as a current playback point for the content item, wherein transmitting the content item includes transmitting the time code or frame as the playback point for the content item.

13. The method of claim 1, further comprising:
    receiving an indication to share the first set of content portions or the filtered set of content portions; and
    generating a link to the first set of content portions or the filtered set of content portions, wherein the link executes playback of the content portions in an interface provided to another user device.

14. The method of claim 1, further comprising:
    displaying a group user interface different than the interface;
    receiving an indication to watch the first set of content portions or the filtered set of content portions in the group user interface; and
    executing playback of the first set of content portions or the filtered set of content portions in the group user interface, wherein the group user interface is linked to one or more other users.

15. The method of claim 1, further comprising:
    generating an updated user profile by updating the first plurality of predetermined stored metadata tags associated with the user profile based on a completed viewing duration of at least the content portion or a user input to the interface; and generating a third set of content portions based on the updated user profile.

16. A non-transitory computer-readable medium comprising executable instructions for a method, the method comprising:
generating, by an application executed by a processing element, a first set of content portions from a plurality of content portions based on a first plurality of predetermined stored metadata tags in a user profile, wherein each content portion includes a subset of frames of a content item;
displaying the first set of content portions in an interface provided to a user device corresponding to the user profile;
generating, by the application, new priority metadata tags based on a calculated similarity between the first plurality of predetermined stored metadata tags and content metadata tags in the first set of content portions, wherein at least one of the new priority metadata tags is different from the predetermined stored metadata tags;
filtering the first set of content portions based on one or more filter inputs to generate a filtered set of content portions, wherein the one or more filter inputs include one or more of the new priority metadata tags; and
transmitting at least one content portion in the filtered set of content portions to the user device for presentation to the user.

17. The non-transitory computer-readable medium of claim 16, wherein the interface is configured to display a set of scene categories; and
wherein a filter input of the one or more filter inputs is selectable from the set of scene categories and wherein the one or more of the new priority metadata tags corresponds to a class selected from activity, mood, franchise, or character.

18. The non-transitory computer-readable medium of claim 16, wherein generating the first set of content portions comprises:
receiving a selection to save a first content portion for a first content item to a playlist file;
determining the first plurality of predetermined stored metadata tags associated with the first content portion selected for saving to the playlist file;
adding the first plurality of predetermined stored metadata tags associated with the first content portion to the user profile;
identifying a highest priority selection of metadata tags from the user profile;
further filtering the first set of content portions based on the highest priority selection of metadata tags; and
compiling the filtered set of content portions into the playlist file.

19. A system comprising:
a processor;
a network interface in communication with the processor; and
a memory store comprising instructions executable by the processor to perform a method, the method comprising:
generating, by an application executed by the processor, a first set of content portions from a plurality of content portions based on a first plurality of predetermined stored metadata tags in a user profile, wherein each content portion includes a subset of frames of a content item;
displaying the first set of content portions in an interface provided to a user device corresponding to the user profile;
generating, by the application, new priority metadata tags based on a calculated similarity between the first plurality of metadata tags and content metadata tags in the first set of content portions, wherein at least one of the new priority metadata tags is different from the predetermined stored metadata tags;
filtering the first set of content portions based on one or more filter inputs to generate a filtered set of content portions, wherein the one or more filter inputs include one or more of the first plurality of metadata tags, one or more of the content metadata tags, or one or more of the new priority metadata tags; and
transmitting at least one content portion in the filtered set of content portions to the user device for presentation to a user.

20. The system of claim 19, wherein transmitting the at least one content portion in the filtered set of content portions for presentation to the user comprises:
transmitting a location of a content item including the at least one content portion; and
transmitting 1) a beginning time code or a beginning frame, and 2) an end time code or an end frame corresponding to a location of the at least one content portion within the content item.

* * * * *